United States Patent [19]

Akasaka

[11] Patent Number: 5,167,129

[45] Date of Patent: Dec. 1, 1992

[54] AUTOMOTIVE AIR CONDITIONING SYSTEM

[75] Inventor: Hitoshi Akasaka, Tokyo, Japan

[73] Assignee: Calsonic Corporation, Tokyo, Japan

[21] Appl. No.: 735,922

[22] Filed: Jul. 25, 1991

[30] Foreign Application Priority Data

Jul. 26, 1990 [JP] Japan .............................. 2-78736[U]
Oct. 30, 1990 [JP] Japan .............................. 2-292482

[51] Int. Cl.⁵ .............................................. F25D 17/00
[52] U.S. Cl. ........................................ 62/179; 165/43; 454/75; 454/144
[58] Field of Search ................ 62/179, 180; 236/49.3; 165/43; 454/75, 105, 137, 144

[56] References Cited

U.S. PATENT DOCUMENTS

| | | | |
|---|---|---|---|
| 3,008,694 | 11/1961 | Todd | 454/105 X |
| 4,376,408 | 3/1983 | Iijima et al. | |
| 4,593,609 | 6/1986 | Nagatomo et al. | |
| 5,042,566 | 8/1991 | Hildebrand | 165/43 X |

FOREIGN PATENT DOCUMENTS 2-143305  12/1990  Japan .
1246803   9/1971  United Kingdom ................ 165/43

Primary Examiner—William E. Wayner
Attorney, Agent, or Firm—Foley & Lardner

[57] ABSTRACT

An automotive air conditioning system is disclosed which is incorporated with a known automatic air conditioner installed in a motor vehicle. The air conditioning system has first, second and third operation modes which are automatically selected. When the system assumes the first operation mode, air in upper and lower portions of the passenger cabin is discharged to outside of the vehicle through upper and lower ducts. When the system assumes the second operation mode, air in the lower portion of is sucked into an air conditioning unit through the lower duct and cooled and blown into the upper portion of the passenger cabin through the upper duct. When the system assumes the third operation mode, air in the upper portion of the passenger cabin is enforcedly discharded to outside of the vehicle through the upper duct.

24 Claims, 16 Drawing Sheets

OUTSIDE AIR TEMPERATURE

INSIDE AIR TEMPERATURE

AUTOMOTIVE AIR CONDITIONING SYSTEM

BACKGROUND OF THE INVENTION

1. Field of the Invention

The present invention relates in general to air conditioning systems used in motor vehicles, and more particularly, to automotive air conditioning systems of a type which effects not only air conditioning in the vehicle but also air ventilation in the same.

2. Description of the Prior Art

Hitherto, various air conditioning systems of the above-mentioned type have been proposed and put into practical use particularly in the field of motor vehicles. In fact, the air conditioning systems of such type are very useful particularly in a case wherein some of passengers in the vehicle are smokers.

Some of conventional air conditioning systems of this type are disclosed in Japanese Patent First Provisional Publications Nos. 60-252019 and 60-252020.

In these systems disclosed, a known air conditioner unit including an evaporator core, a heater core and a blower is installed in a front portion of the vehicle, and a ventilation device is further employed. The air conditioner unit has a plurality of conditioned air outlets exposed to a front portion of the passenger cabin of the vehicle. The ventilation device comprises an air ventilation duct mounted beneath the ceiling of a passenger cabin and an electric blower mounted in the duct. The ventilation duct has an air intake opening exposed to the upper portion of the passenger cabin. Upon energization of the blower, the ventilation duct intakes air from the passenger cabin and discharges the same to outside of the vehicle. With this, the contaminated air, that is, air contaminated with tobacco or cigarette smoke or the like is enforcedly discharged to outside of the vehicle.

Such air discharging is useful also under operation of a heater of the air conditioner in winter. That is, usually, under operation of the heater, due to the nature of things, an upper portion of the passenger cabin is more heated than a lower portion, which tends to give uncomfortable feeling to the passengers. Furthermore, the heating of the passenger cabin by the heater tends to cause formation of undesired mist on windows particularly in a case wherein many passengers are in the vehicle. In these cases, the air discharging is carried out by starting the ventilation device.

Furthermore, in summer, such air discharging is effective also in achieving a quick cooling in the hot passenger cabin of the vehicle which has been parked for a long time under the blazing sun. That is, in such case, prior to starting the cooler of the air conditioner, the hot air in the passenger cabin is discharged to outside by operating the ventilation device.

However, in fact, the above-mentioned conventional ventilation devices have the following drawbacks due to their inherent constructions.

That is, under operation of the heater in winter, starting the air ventilation device tends to cause the hot air from the air outlets of the air conditioner unit to be directed toward heads of the passengers due to positioning of the air intake opening of the ventilation duct at the ceiling of the passenger cabin. This phenomenon makes the passengers uncomfortable irrespective of the operation of the ventilation device. Furthermore, such directed flow of hot air tends to produce hot air pockets at various portions in the passenger cabin, which cause formation of mist on various portions of the windows.

Furthermore, under operation of the cooler in summer, starting the ventilation device tends to cause the cooled air from the air outlets of the air conditioner unit to be directly sucked by the air intake opening of the ventilation duct. In this case, effective and quick cooling of the passenger cabin is not expected. This undesirable phenomenon is marked particularly in air conditioners of automatic type in which flowing direction, flowing velocity and temperature of the conditioned air blown into the passenger cabin are automatically adjusted in accordance with conditions of the passenger cabin and those of the outside of the passenger cabin. This direct discharging of the conditioned air furthermore tends to produce disagreeably warm air pockets in the vicinity of the rear seat.

Furthermore, due to positioning of the air intake opening of the ventilation duct at the ceiling, it tends to occur that air contaminated or smoked by one passenger is forced to flow over the face of the other passenger before being sucked into the air intake port of the ventilation duct. This is quite uncomfortable to the other passenger.

SUMMARY OF THE INVENTION

It is therefore an object of the present invention to provide an automotive air conditioning system which is incorporated with an automatic air conditioner installed in a motor vehicle in a manner to be free of the above-mentioned drawbacks.

According to a first aspect of the present invention, there is provided an automotive air conditioning system which is incorporated with an automatic air conditioner installed in a motor vehicle, by which system ventilation, air cooling and smoke discharge of a passenger cabin are effectively and quickly carried out.

According to a second aspect of the present invention, there is provided an automotive air conditioning system which is incorporated with an automatic air conditioner installed in a motor vehicle, the system including mutually independent two air conditioning lines which are arranged to automatically or manually condition two given spaces of the passenger cabin individually. The given spaces may be a right-half space of the passenger cabin in which a driver is positioned and a left-half space of the cabin in which a front seat occupant is positioned.

According to a third aspect of the present invention, there is provided an air conditioning system for use with an automatic air conditioner installed in a motor vehicle. The system comprises a first duct extending to a ceiling of a passenger cabin of the vehicle and having an opening which is exposed to an upper portion of the passenger cabin; a second duct extending along a floor of the vehicle and having an opening which is exposed to a lower portion of the passenger cabin; an air conditioning unit having an electric fan and an evaporator installed therein, the unit being connected to the first and second ducts and having first, second and third operation modes, the first operation mode being a mode in which, under operation of the electric fan, air in the passenger cabin is forced to be sucked into the unit through the first and second ducts and discharged to outside of the vehicle, the second operation mode being a mode in which, under operation of the electric fan, air in the passenger cabin is sucked into the unit through the second duct, cooled by the evaporator, fed to the first duct and blown into the passenger cabin from the opening of the first duct, and the third operation mode being a mode in which contaminated air is sucked into the unit from the opening of the first duct and discharged to outside of the vehicle; sensor means for producing information signals which are representative of conditions of the passenger cabin; and a control device for permitting the air conditioning unit to select one of the first, second and third operation modes in accordance with information signals issued from the sensor means and for controlling the speed of the electric fan in accordance with the information signals issued from the sensor means and those issued from a front fan control device which controls the speed of an electric fan installed in the automatic air conditioner.

According to a fourth aspect of the present invention, there is provided an air conditioning system for use with an automatic air conditioner installed in a motor vehicle. The system comprises two substantially identical air conditioning lines which are constructed to condition air in two given spaces of a passenger cabin of the vehicle respectively; sensor means for producing information signals which are representative of respective conditions of the two given spaces of the passenger cabin; and a control device for controlling the two air conditioning lines in accordance with the information signals from both of the sensor means and a front air conditioner control device which controls the automatic air conditioner, the control device having a first control mode wherein the two air conditioning lines are independently but automatically controlled in accordance with the information signals, a second control mode wherein the two air conditioning lines are identically but automatically controlled in accordance with the information signals and a third control mode wherein the two air conditioning lines are independently controlled in a way manually set, wherein each of the two air conditioning lines comprises a first duct extending to a ceiling of a passenger cabin of the vehicle and having an opening which is exposed to an upper portion of one given space of the passenger cabin; a second duct extending along a floor of the vehicle and having an opening which is exposed to a lower portion of one given space of the passenger cabin; an air conditioning unit having an electric fan means and an evaporator means installed therein, the unit being connected to the first and second ducts and having first, second and third operation modes, the first operation mode being a mode in which, under operation of the electric fan means, air in the passenger cabin is forced to be sucked into the unit through the first and second ducts and discharged to outside of the vehicle, the second operation mode being a mode in which, under operation of the electric fan, air in the passenger cabin is sucked into the unit through the second duct, cooled by the evaporator means, fed to the first duct and blown into the given space of the passenger cabin from the opening of the first duct, and the third operation mode being a mode in which contaminated air is sucked into the unit from the opening of the first duct and discharged to outside of the vehicle.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

FIRST EMBODIMENT

Referring to FIGS. 1 to 6 of the accompanying drawings, there is shown a first embodiment of the present invention, which is an automotive air conditioning system.

Figure 1:
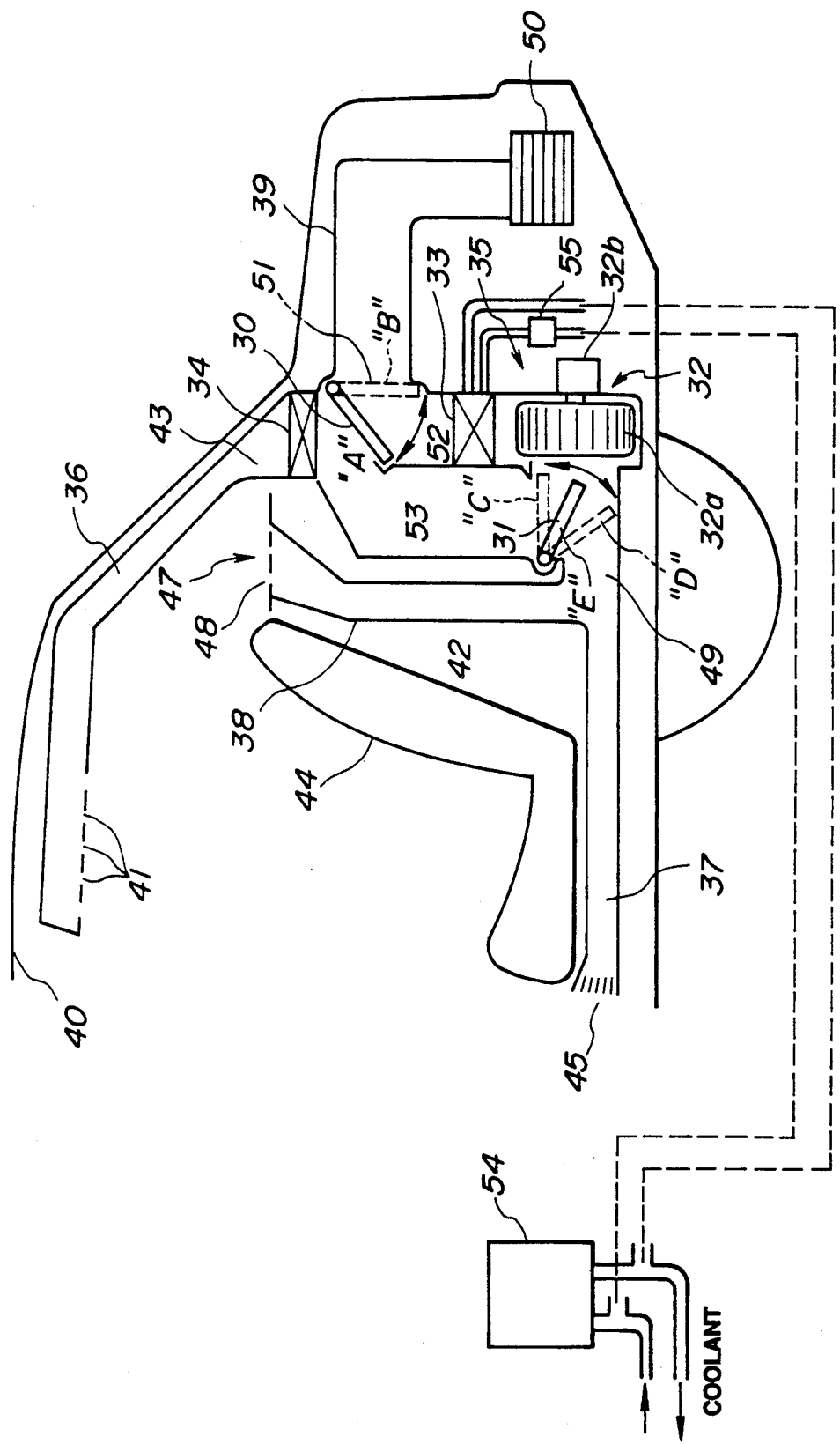
FIG. 1 is a schematic view of a rear portion of a passenger motor vehicle, to which an automotive air conditioning system of a first embodiment of the present invention is practically applied.

In FIG. 1, there is shown a rear portion of a passenger motor vehicle, to which the first embodiment of the present invention is practically applied.

Although not shown in the drawing, a known automatic air conditioner is installed in a front portion of the vehicle. As will become apparent as the description proceeds, the air conditioning system of the invention is incorporated with the automatic air conditioner.

As shown in FIG. 1, the air conditioning system comprises an air conditioning unit 35 installed in a rear portion of the vehicle. The air conditioning unit 35 includes generally a case 42, a first door 30, a second door 31, an electric fan device 32, an evaporator 33 and an electric air filtering device 34. Connected to the unit 35 are a ceiling duct 36, a floor duct 37, a parcel shelf duct 38 and a discharge duct 39.

As is shown, the ceiling duct 36 extends from an air inlet and outlet opening 43 formed in the case 42 of the air conditioning unit 35. The ceiling duct 36 extends upward to a ceiling 40 of the vehicle and has at its leading end portion a plurality of small openings 41 exposed to an upper portion of a passenger cabin of the vehicle. As will become apparent hereinafter, the openings 41 serve as both an air inlet and an air outlet.

As shown, the floor duct 37 extends forward from an air intake opening 49 of the case 42. Passing under a rear seat 44, the floor duct 37 extends to a front portion of the rear seat 44. The floor duct 37 has at its leading end an air inlet 45.

The parcel shelf duct 38 extends upward from the air intake opening 49 to a rear parcel shelf 47. The parcel shelf 47 has a plurality of small openings 48 which serve as an intake opening of the duct 38.

The discharge duct 39 extends rearward from an air outlet opening 51 of the case 42 to a discharge opening 50 formed in the vehicle body.

Within the case 42 of the air conditioning unit 35, there are defined a main passage 52 which connects the air intake opening 49 to the air inlet and outlet opening 43, and a bypass passage 53 which bypasses the main passage 52.

Within the main passage 52, there are installed the fan device 32 which forces to flow air from the air intake opening 49 toward the air outlet opening 51, and the evaporator 33 which cools the air driven by the fan device 32.

The fan device 32 comprises a fan 32a located within the main passage 52 and an electric motor 32b mounted to the case 42. That is, upon energization of the motor 32b, the same drives the fan 32a to make the air flow in the main passage 52.

The evaporator 52 has inlet and outlet openings which are connected through coolant feeding and returning pipes to inlet and outlet openings of a main evaporator 54 of the afore-mentioned automatic air conditioner installed in the front portion of the vehicle. An electromagnetic valve 55 is connected to the coolant feeding pipe. Thus, when the valve 55 is energized to assume its open condition, coolant is fed to the evaporator 33 and thus air from the fan 32a is cooled by the evaporator 33.

If desired, in place of the evaporator 33, a thermo-electric cooling device or the like may be used.

The air filtering device 34 is installed in the air inlet and outlet opening 43 of the case 42. The air filtering device 34 is of a known electrostatic type which collects fine particles in air by using static electricity.

If desired, the air filtering device 34 may be installed in the air intake opening 49 or between the fan 32a and the evaporator 33.

The first door 30 is pivotally connected to a downstream end of the main passage 52.

The first door 30 has two operative positions, one position being the position indicated by reference "A" wherein the downstream end of the main passage 52 is communicated with the air outlet opening 51 and at the same time the air inlet and outlet opening 43 is communicated with only the bypass passage 53, and the other position being the position indicated by reference "B" wherein the air outlet opening 51 is closed and at the same time the air inlet and outlet opening 43 is communicated with both the main and bypass passages 52 and 53.

As will become apparent as the description proceeds, when the first door 30 assumes the position "A", air driven by the fan 32a is led into the discharge duct 39 through the air outlet opening 51 and air sucked from the air inlet and outlet opening 43 is led into the bypass passage 53, and when the first door 30 assumes the position "B", air driven by the fan 32a is led into the air inlet and outlet opening 43.

It is to be noted that air led into the discharge duct 39 is discharged to outside of the vehicle through the discharge opening 50, while, air led into the air inlet and outlet opening 43 is blown into the passenger cabin from the small openings 41 of the ceiling duct 36.

The second door 31 is pivotally connected to the case 42 near the air intake opening 49.

The second door 31 has three operative positions, the first position being the position indicated by reference "C" wherein an inlet part of the bypass passage 53 is closed, the second position being the position indicated by reference "D" wherein the air intake opening 49 is closed, and the third position being the position as indicated by reference "E" wherein both the inlet part of the bypass passage 53 and the air intake opening 49 are opened but half.

As will become apparent hereinafter, when the second door 31 assumes the position "C" and thus closes the bypass passage 53, the air intake opening 49 becomes opened, so that air near the lower front portion of the rear seat 44 and near the rear parcel shelf 47 is led into the main passage 52 through the floor duct 37 and the parcel shelf duct 38 respectively.

When the second door 31 is pivoted to the position "D" and thus closes the air intake opening 49, the inlet part of the bypass passage 53 becomes opened, so that, with the first door 30 assuming the position "A", air in the upper portion of the passenger cabin is led through the ceiling duct 36 into the bypass passage 53 and then led to the main passage 52.

When the second door 31 is pivoted to the position "E" and thus opens the inlet part of the bypass passage 53 and the air intake opening 49, air near the lower front portion of the rear seat 44, near the rear parcel shelf 47 and near the ceiling 40 is led into the main passage 52 through the ducts 37, 38 and 36 respectively.

That is, when, as shown by solid lines, the second door 31 assumes the position "E" and the first door 30 assumes the position "A", energization of the electric fan device 32 induces a ventilation mode wherein air from various portions of the passenger cabin is discharged to outside of the vehicle. Under this condition, the passenger cabin is ventilated.

When the second door 31 assumes the position "C" and the first door 30 assumes the position "B", energization of the electric fan device 32 induces an air cooling mode wherein air near the front lower portion of the rear seat 44 and near the rear parcel shelf 47 is led through the floor duct 37 and the parcel shelf duct 38 into the main passage 52 and then into the ceiling duct 36 for being blown into the passenger cabin from the small openings 41 of the ceiling 40. Under this condition, the electromagnetic valve 55 assumes its open position and the air filtering device 34 is energized. Thus, air blown into the passenger cabin from the openings 41 of the ceiling duct is cooled and cleaned.

When the second door 31 assumes the position "D" and the first door 30 assumes the position "A", energization of the electric fan device 32 induces a smoke discharge mode wherein air near the ceiling 40 is discharged to outside of the vehicle through the ceiling duct 36, the bypass passage 53, the main passage 52, the discharge duct 39 and the discharge opening 50.

Figure 2:
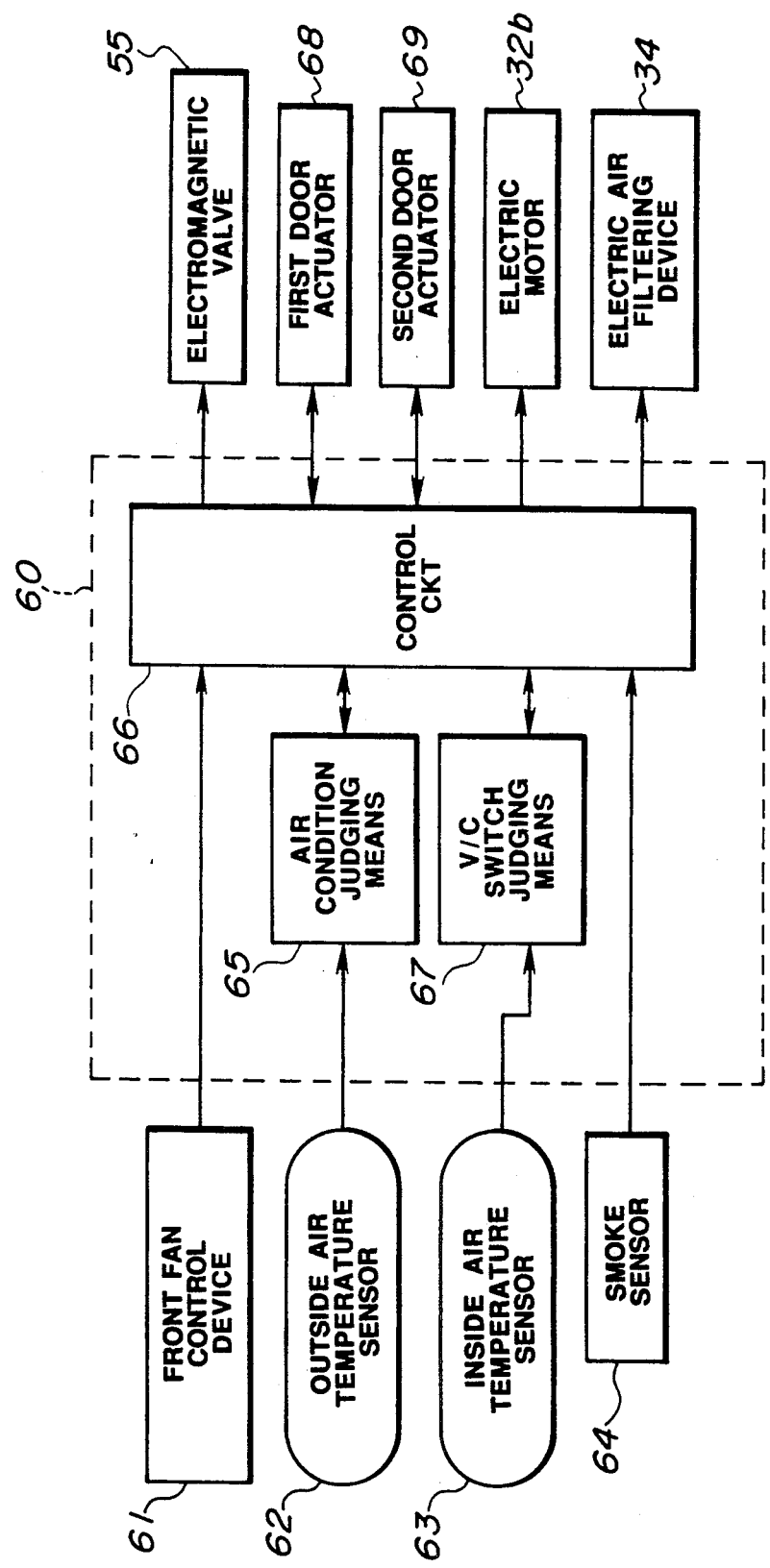
FIG. 2 is a block diagram of a control device used in the first embodiment of the invention.

As is understood from FIG. 2, the pivotal movements of the first and second doors 30 and 31 are carried out by first and second door electric actuators 68 and 69.

FIG. 2 shows schematically a control device 60 for controlling the air conditioning system of the first embodiment.

The control device 60 includes a microcomputer. Informations from a front fan control device 61, an outside air temperature sensor 62, an inside air temperature sensor 63 and a smoke sensor 64 are fed to the control device 60.

The front fan control device 61 is a device for controlling an electric fan (not shown) installed in the automatic air conditioner mounted in the front portion of the vehicle. Information on the voltage applied to the electric fan is fed to an after-mentioned control circuit 66 of the control device 61. That is, the information represents the air quantity blown by the front fan of the automatic air conditioner. In the disclosed embodiment, for achieving high, intermediate and low speed rotations of the front fan, three types of voltages, viz., high, intermediate and low voltages, are selectively applied to the electric fan.

The outside air temperature sensor 62 senses the temperature of outside of the vehicle, and the inside air temperature sensor 63 senses the temperature of inside of the vehicle. These sensors 62 and 63 are commonly used for controlling the automatic air conditioner mounted in the front portion of the vehicle.

The smoke sensor 64 is a conventional sensor which can sense tobacco or cigarette smoke floating in the passenger cabin. The sensor 64 comprises a probe part, such as a photo detector, a gas detector or the like and a processing part which processes data from the probe part to output an information signal representative of degree of contamination of air in the passenger cabin. In the disclosed embodiment, in accordance with the degree of contamination of air in the passenger cabin, the smoke sensor 64 outputs three types of information signals, which are signals representing high contaminated, intermediately contaminated and less contaminated air in the passenger cabin.

The control device 60 is equipped with an air condition judging means 65 to which the temperature information from the outside air temperature sensor 62 is fed.

Figure 3:
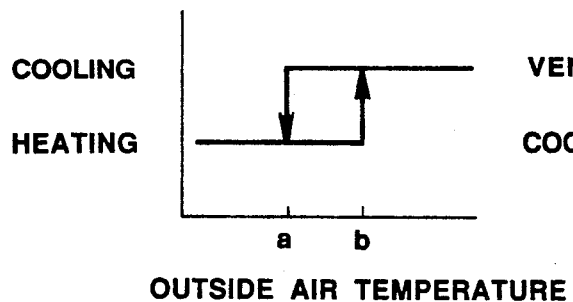
FIGS. 3, 4 and 5 are illustrations respectively showing various matters which are controlled by the control device.

As is seen from the graph of FIG. 3, by processing the temperature information from the outside air temperature sensor 62, the air condition judging means 65 judges whether the passenger cabin is under air cooling or air heating. That is, as is understood from the graph, there is defined a predetermined temperature range from "a" to "b" with a given hysteresis, which can be used as a reference for judging the condition of the passenger cabin.

More specifically, when the outside air temperature is higher than the range, it is judged that the passenger cabin is under air cooling, and when the outside air temperature is lower than the range, it is judged that the cabin is under air heating. Furthermore, when the outside air temperature is within the range, it is judged that the preset condition is kept in the cabin.

If desired, such judgement may be achieved by detecting the state of a conditioned air outlet of the automatic air conditioner mounted in the front portion of the vehicle.

Upon judgement of air cooling, the air condition judging means 65 outputs a signal (which will be referred to as "air cooling signal" hereinafter for simplification of description) representing necessity of air cooling in the cabin, while upon judgement of air heating, the judging means 65 outputs another signal (which will be referred to as "air heating signal" hereinafter) representing necessity of air heating in the cabin.

The control device 60 is further equipped with a ventilation/cooling switch judging means 67 to which the temperature information from the inside air temperature sensor 63 is fed.

Figure 4:
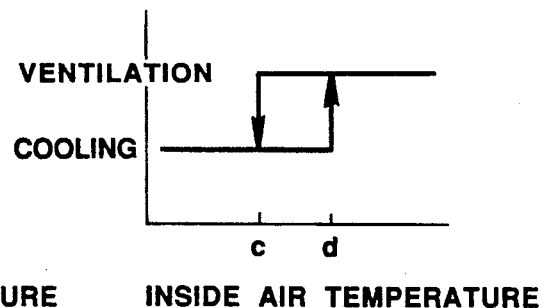

As is understood from the graph of FIG. 4, by processing the temperature information from the inside air temperature sensor 63, the judging means 67 judges whether the passenger cabin should be ventilated or cooled. As is described hereinabove, when, in summer, a vehicle has been parked for a long time under the blazing sun, the temperature of the passenger cabin becomes very higher than that of outside of the vehicle. In this case, it is preferable to carry out the ventilation of the cabin prior to starting cooling of the same. In order to judge this preference, the judging means 67 is employed. That is, as is understood from the graph, there is defined a predetermined temperature range from "c" to "d" with a given hysteresis, which can be used as a reference for judging such preference.

More specifically, when the inside air temperature is higher than the range, it is judged that the passenger cabin should be ventilated at first, and when the inside air temperature is lower than the range, it is judged that the cabin should be cooled instantly. Furthermore, when the inside air temperature is within the range, it is judged that the preset condition is kept in the cabin.

Upon judgement of necessity of ventilation, the judging means 67 outputs a signal (which will be referred to as "cabin ventilation signal" hereinafter for simplification of the description) representing the necessity of ventilation of the passenger cabin, while, upon judgement of necessity of cabin cooling, the means 67 outputs a signal (which will be referred to as "air cooling signal") representing the necessity of the cabin cooling.

Upon receiving the air heating signal from the air condition judging means 65, the control circuit 66 outputs a so-called "air discharge signal" to the first door actuator 68 to pivot the first door 30 to the position "A" and at the same time the control circuit 66 outputs a so-called "rear-upper air suction signal" to the second door actuator 69 to pivot the second door 31 to the position "E".

Furthermore, in this case, the control circuit 66 applies the electric motor 32b with a voltage which corresponds to the voltage signal issued from the front fan control device 61. More specifically, upon receiving high, intermediate or low voltage from the front fan control device 61, the control circuit 66 applies high, intermediate or low voltage to the fan motor 32b for achieving high speed, intermediate speed or low speed rotation of the fan 32a.

Figure 5:
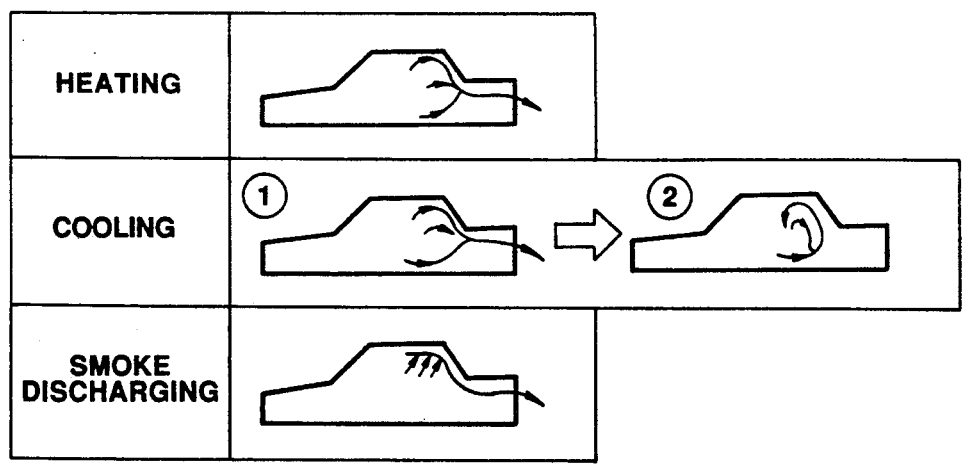

The manner of air flow under this condition will be easily understood from the uppermost illustration of FIG. 5. That is, under heating of the passenger cabin of the vehicle, the automatic air conditioner mounted in the front portion of the vehicle operates to heat air, which comes from outside of the vehicle, and feed the heated air to the passenger cabin. Thus, under this condition, the air condition judging means 65 outputs the air heating signal. Upon receiving this signal, the control circuit 66 controls the various parts 68, 69 and 32b so that air in the passenger cabin by the amount corresponding to that of air blown by the automatic air conditioner is sucked from the ceiling openings 41, the air inlet 45 of the floor duct 37 and the air inlet 48 of the parcel shelf duct 38 and discharged to outside of the vehicle through the discharge opening 50.

While, when receiving the air cooling signal from the air condition judging means 65, the control circuit 66 judges whether the passenger cabin should be ventilated before starting the cabin cooling or not by analyzing the signal issued from the ventilation/cooling switch judging means 67.

When, under this, the judging means 67 issues the cabin ventilation signal, the control circuit 66 outputs the air discharge signal to the first door actuator 68 to pivot the first door 30 to the position "A" and at the same time the control circuit 66 outputs the upper air suction signal to the second door actuator 69 to pivot the second door 31 to the position "E".

Furthermore, the control circuit 66 applies the electric motor 32b with a high voltage irrespective of the degree of the voltage signal issued by the front fan control device 61. Thus, the fan 32a of the fan device 32 rotates at its highest speed to achieve a quick air ventilation of the passenger cabin.

That is, as is seen from the middle part of FIG. 5, when, upon requirement of cabin cooling, the temperature of the cabin is very high as compared with that of outside air, quick air ventilation of the cabin is carried out, as shown by the illustration indicated by numeral (1). Of course, the heated air in the cabin is discharged to outside of the vehicle through the discharge opening 50.

Due to this ventilation, the temperature of the passenger cabin is lowered to a degree of the outside air.

When thus the ventilation/cooling switch means 67 issues the air cooling signal, the control circuit 66 outputs a so-called "cooled air blowing signal" to the first door actuator 68 to pivot the first door 30 to the position "B" and at the same time the control circuit 66 outputs a so-called "rear air suction signal" to the second door actuator 69 to pivot the second door 31 to the position "C".

Furthermore, in this case, the control circuit 66 applies the electric motor 32b of the fan device 32 with a voltage which corresponds to the voltage signal issued from the front fan control device 61, and at the same time, the control circuit 66 operates to open the electromagnetic valve 55 and energize the electric air filtering device 34.

The manner of air flow under this condition will be easily understood from the right illustration (indicated by numeral (2)) of the middle part of FIG. 5. That is, under this air cooling condition, the fan 32a of the fan device 32 rotates at a speed corresponding to that of the front fan. Thus, air in the passenger cabin is sucked from the air inlet 45 of the floor duct 37 and the air inlet 48 of the parcel shelf duct 38, cooled by the evaporator 33, cleaned by the air filtering device 34 and blown into the passenger cabin from the ceiling openings 41.

When the smoke sensor 64 issues one of the three types of air contaminated signal, the control circuit 66 outputs the air discharge signal to the first door actuator 68 to pivot the first door to the position "A" and at the same time, the control circuit 66 outputs the upper air suction signal to the second door actuator 69 to pivot the second door 31 to the position "D". Furthermore, upon this, the control circuit 66 applies the fan motor 32b with a voltage of degree which corresponds to the degree of contamination of air in the passenger cabin. That is, if the air is very contaminated, a high voltage is applied to the motor 32b to rotate the fan 32a at a high speed to achieve a quick air discharging.

It is to be noted that this air discharging is carried out taking preference over the above-mentioned control.

The manner of air flow under this condition will be easily understood from the lowermost illustration of FIG. 5. Under the air discharging mode, contaminated air floating in the upper portion of the passenger cabin is sucked by the ceiling openings 41 and discharged to outside of the vehicle through the discharge opening 50 of the vehicle.

Figure 6:
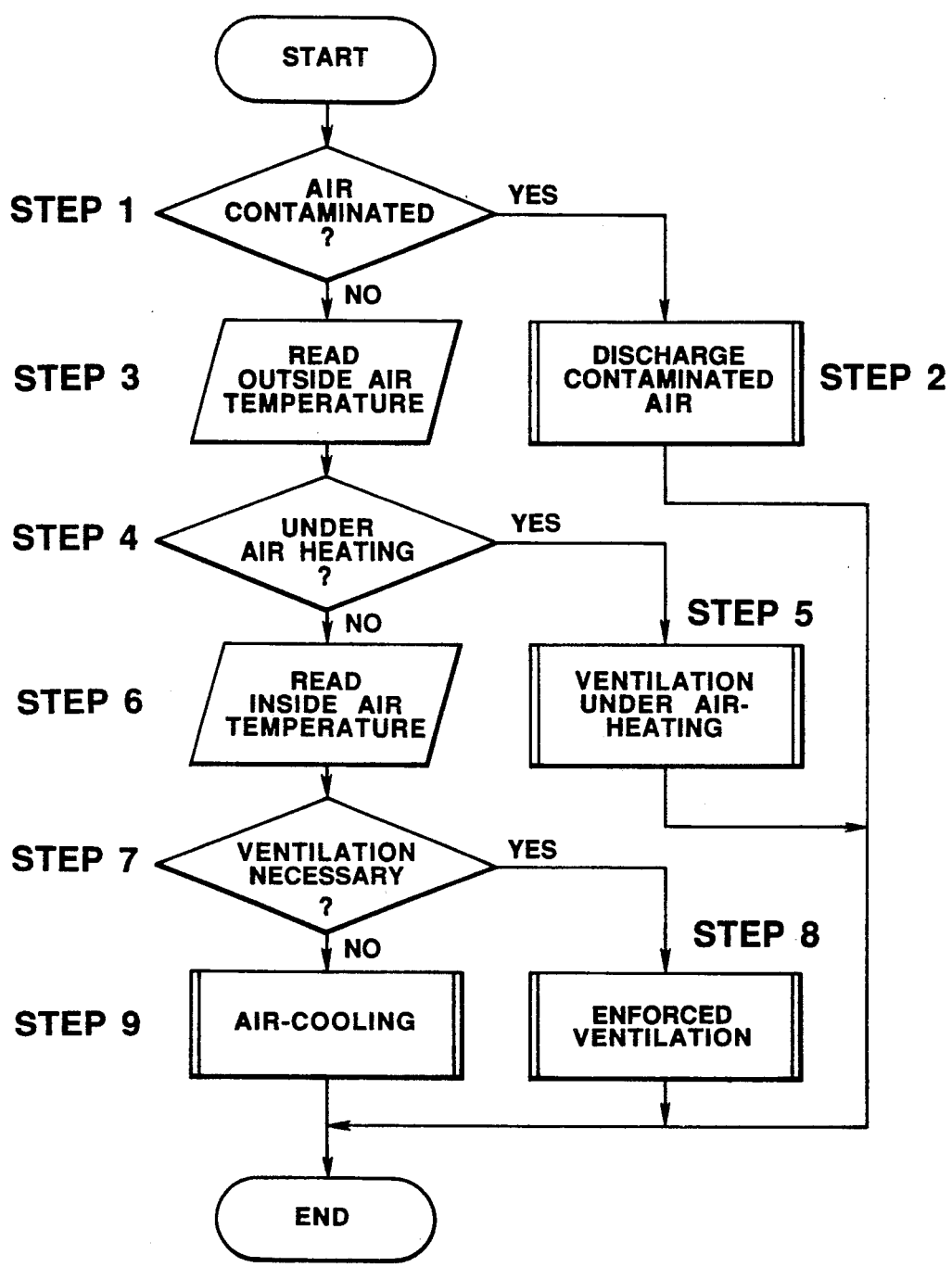
FIG. 6 is a flowchart showing programmed operation steps carried out by the control device.

The above-mentioned operation will be more clearly understood from the flowchart shown in FIG. 6 which shows programmed steps carried out in the microcomputer of the control device 66.

At step 1, a judgement is carried out as to whether the smoke sensor 64 issues the air contaminated signal or not. When Yes, that is, the sensor 64 issues such signal, the operation step goes to step 2. In this step, the air discharge signal is applied to the first door actuator 68 to pivot the first door 30 to the position "A" and the upper air suction signal is applied to the second door actuator 69 to pivot the second door 31 to the position "D", and at the same time, the fan motor 32b is applied with a voltage whose intensity corresponds to the degree of contamination of air in the passenger cabin. Thus, as has been mentioned hereinabove, the contaminated air is sucked from the ceiling openings 41 and discharged to outside of the vehicle through the discharge opening 50.

If No, at step 1, that is, when the judgement is so made that the smoke sensor 64 issues no air contaminated signal, the control circuit 66 operates the air condition judging means 65 and the operation step goes to step 3 wherein the surrounding air temperature is read by the outside air temperature sensor 62. Then, the operation step goes to step 4 wherein by analyzing the information signal from the outside air temperature sensor 62, the air condition judging means 65 judges whether the passenger cabin is under air heating or not.

If Yes, that is, when the passenger cabin is under the air heating, the operation step goes to step 5. In this step, the control circuit 66 applies the first door actuator 68 with the air discharge signal to pivot the first door 30 to the position "A" and at the same time the control circuit 66 applies the second door actuator 69 with the rear-upper air suction signal to pivot the second door 31 to the position "E", and furthermore, the control circuit applies the fan motor 32b with a voltage which corresponds to the voltage signal issued from the front fan control device 61. That is, in this condition, air ventilation under air heating is carried out in the passenger cabin.

If No at step 4, that is, when the air condition judgement means 65 judges that the passenger cabin is under air cooling, the control circuit 66 operates the ventilation/cooling switch judging means 67 and the operation step goes to step 6 wherein the air temperature in the passenger cabin is read by the inside air temperature sensor 63. Then, the operation step goes to step 7. At this step, a judgement is carried out as to whether the passenger cabin should be ventilated or not.

If Yes, that is, when the judgement is so made that the cabin should be ventilated, the operation step goes to step 8. At this step, the control circuit 66 applies the first door actuator 68 with the air discharge signal to pivot the first door 30 to the position "A" and at the same time the control circuit 66 applies the second door actuator 69 with the rear-upper air suction signal to pivot the second door 31 to the position "E" and furthermore, the control circuit 66 applies the fan motor 32b with a high voltage to rotate the fan 32a at a high speed. Thus, air in the passenger cabin is sucked from the ceiling openings 41, the air inlet 45 of the floor duct 37 and the air inlet 48 of the parcel shelf duct 38 and enforcedly discharged to outside of the vehicle through the discharge opening 50. That is, an enforced ventilation is carried out in the passenger cabin.

If No at step 7, that is, when the judgement is so made that there is no need of ventilation, the operation step goes to step 9. At this step, the control circuit 66 applies the first door actuator 68 with the cooled air blowing signal to pivot the first door 30 to the position "B" and at the same time the control circuit 66 applies the second door actuator 69 with the rear air suction signal to pivot the second door 31 to the position "C" and furthermore, the control circuit 66 applies the fan motor 32b with a voltage which corresponds to the voltage signal issued by the front fan control device 61. Furthermore, the control circuit 66 operates to open the electromagnetic valve 55 and energize the electric air filtering device 34. Thus, air in the passenger cabin is sucked from the air inlet 45 of the floor duct 37 and the air inlet 48 of the parcel shelf duct 38, cooled by the evaporator 33, cleaned by the air filtering device 34 and blown into the passenger cabin from the ceiling openings 41.

In the following, advantages of the first embodiment will be described.

AIR HEATING

Under air heating, air in the passenger cabin by the amount corresponding to that of heated air blown from the automatic air conditioner mounted in the front portion of the vehicle is kept discharged to outside of the vehicle through the three air inlets which are ceiling openings 41, the air inlet 45 of the floor duct 37 and the air inlet 48 of the parcel shelf duct 38. Due to provision of such three air inlets, the heated air from the automatic air conditioner forms at least three air flows which are directed to such air inlets. This means that the amount of hot air directed toward the ceiling openings is considerably reduced as compared with the above-mentioned conventional air conditioning system. Thus, the passengers in the vehicle are prevented from having their faces exposed to the disagreeably warm air flow from the automatic air conditioner. This advantageous phenomenon is promoted by the air inlet 45 of the floor duct 37 from which relatively high temperature air from the automatic air condition is drawn to outside of the vehicle. Furthermore, formation of at least three air flows in the passenger cabin induces a uniformed air flow in the entire of the passenger cabin thereby preventing formation of undesirable mist on various portions of the windows. Particularly, the rear seat occupants can enjoy comfortable air heating.

AIR COOLING when, in summer, a vehicle has been parked for a long time under the blazing sun, the temperature of the passenger cabin becomes much higher than that of outside of the vehicle. In this case, the hot air in the passenger cabin is enforcedly discharged to outside of the vehicle. Due to provision of the three air inlets 41, 45 and 48, such air discharging is quickly and effectively carried out. Thereafter, air cooling is carried out in such a manner that air in the passenger cabin is sucked from the air inlet 45 of the floor duct 37 and the air inlet 48 of the parcel shelf duct 38, cooled by the evaporator 33, cleaned by the air filtering device 34 and blown into the passenger cabin from the ceiling openings 41. Because the hot air has been already discharged, this air cooling is quickly and effectively carried out.

CONTAMINATED AIR DISCHARGING

When air in the passenger cabin becomes contaminated due to smoking of passengers, the air discharging is enforcedly carried out through the ceiling openings 41.

SECOND EMBODIMENT

Referring to FIGS. 7 to 22, there is shown a second embodiment of the present invention, which is an automotive air conditioning system.

Figure 7:
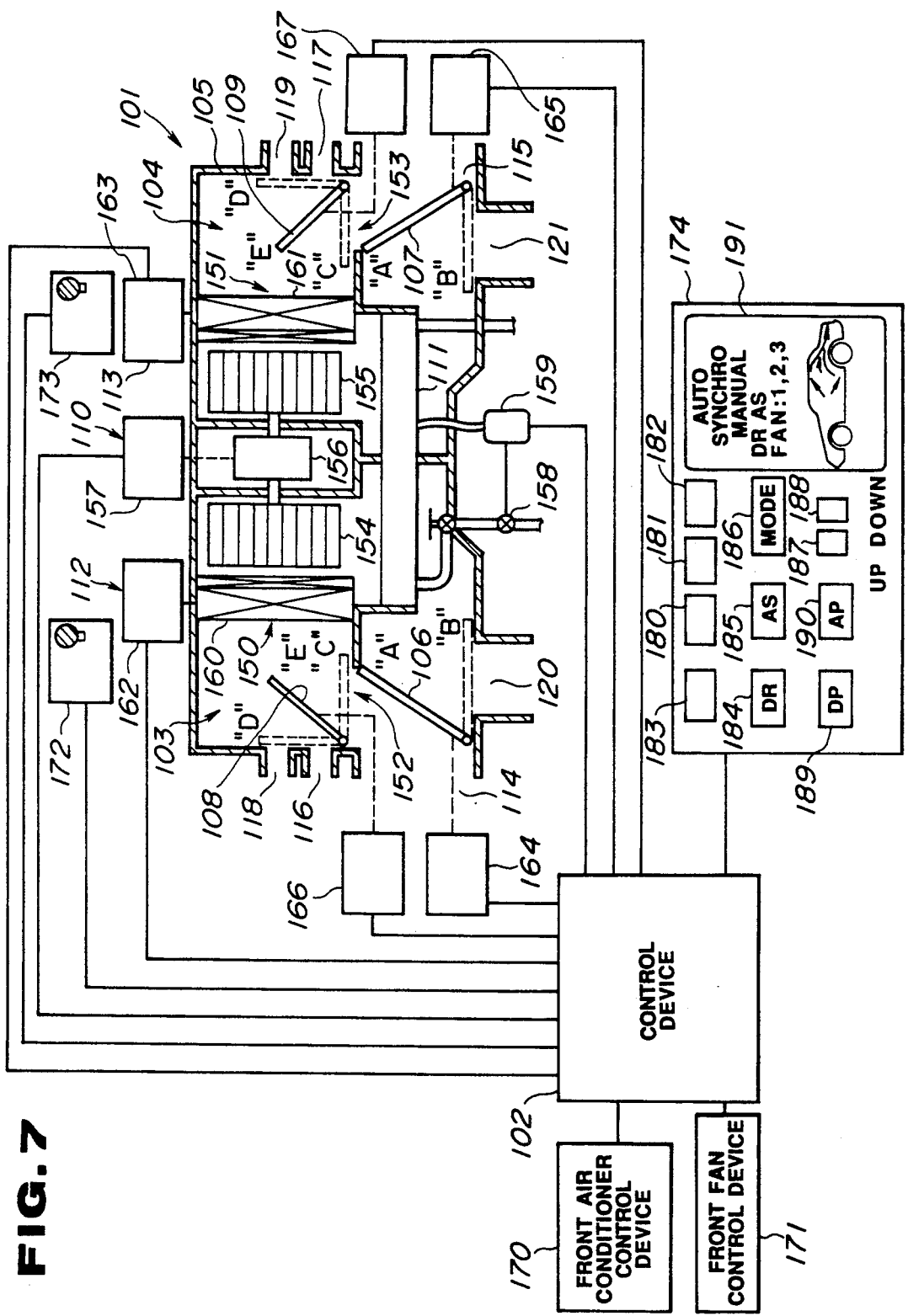
FIG. 7 is a schematic view showing an automotive air conditioning system of a second embodiment of the present invention.

As is understood from FIG. 7, the air conditioning system of the second embodiment comprises an air conditioning unit 101 which is controlled by a control device 102. The air conditioning unit 101 is installed in a rear portion of the vehicle and constructed to effect both air ventilation and air cooling in the passenger cabin.

Although not shown in the drawings, a known automatic air conditioner is installed in a front portion of the vehicle. As will become apparent as the description proceeds, the air conditioning system of the embodiment is incorporated with the automatic air conditioner.

As is seen from FIG. 7, the air conditioning unit 101 is provided with two air conditioning chambers 103 and 104 which are constructed to condition air fed to two given spaces in the passenger cabin.

The given spaces are a right-half space (which will be referred to as "D-space" hereinafter) of the passenger cabin in which the driver is placed and a left-half space (which will be referred to as "A-space" hereinafter) of the passenger cabin in which a front seat occupant is placed. Thus, hereinafter, the chamber 103 of the unit 1 will be referred to as "D-conditioning chamber" and the other chamber 104 will be referred to as "A-conditioning chamber".

The air conditioning unit 101 comprises a case 105 in which the D-conditioning chamber 103 and the A-conditioning chamber 104 are defined. Each conditioning chamber 103 or 104 is incorporated with a first door 106 or 107, a second door 108 or 109 and an electric air filtering device 112 or 113 in a manner as will be described hereinafter. An electric fan device 110 and an evaporator 111 are also installed in the case 105.

The case 105 has, for each conditioning chamber 103 or 104, a ceiling duct connecting port 114 or 115, a floor duct connecting port 116 or 117, a parcel shelf duct connecting port 118 or 119 and an air discharge port 120 or 121.

Figure 8:
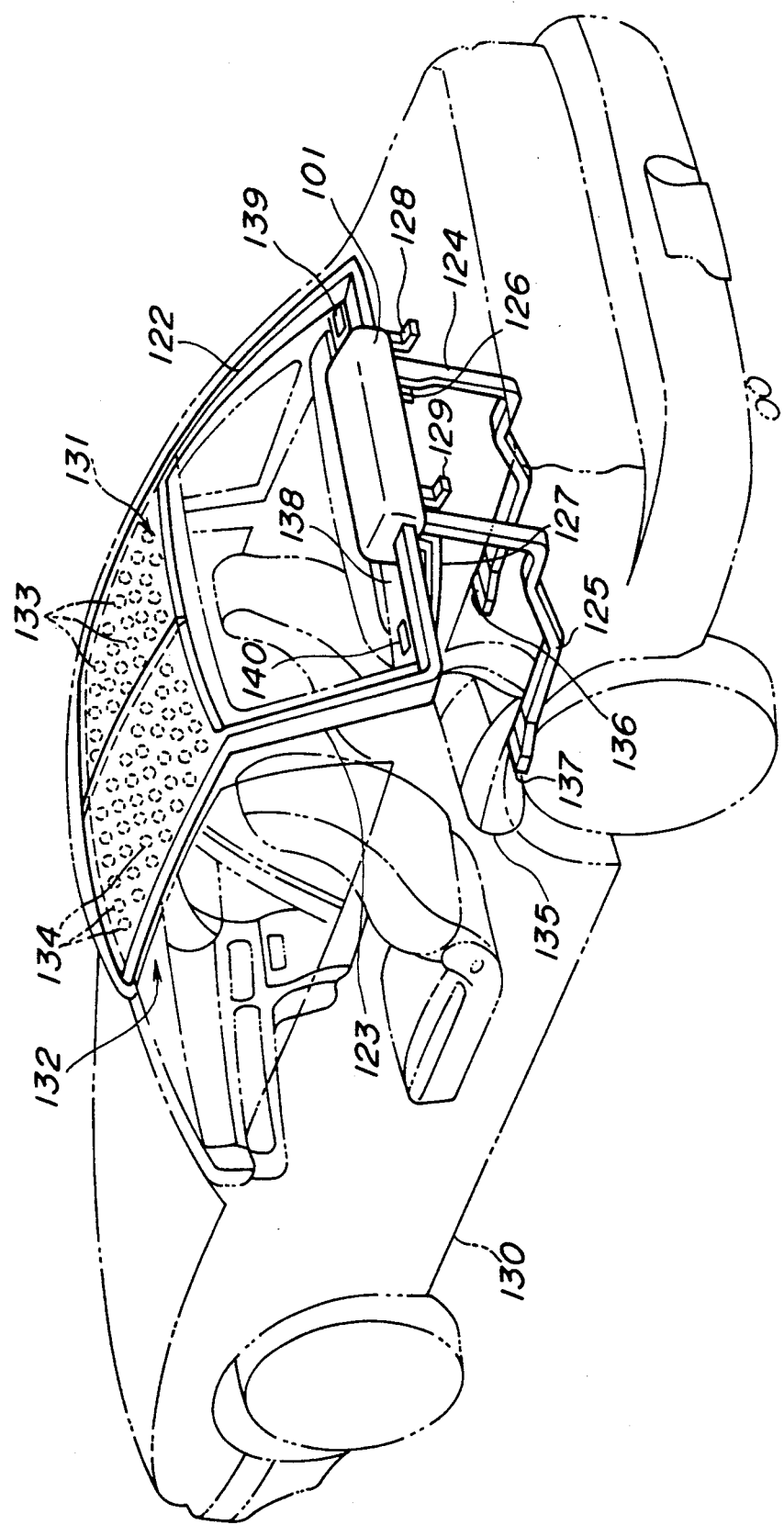
FIG. 8 is a schematic view of a passenger motor vehicle to which the second embodiment of the present invention is practically applied.

As will be understood from FIGS. 7 and 8, a ceiling duct 122 or 123 extends laterally and upward from each port 114 or 115, a floor duct 124 or 125 extends downward and forward from each port 116 or 117, a parcel shelf duct 126 or 127 extends downward and forward from each port 118 or 119 and an air discharge duct 128 or 129 extends downward from each port 120 or 121.

As is seen from FIG. 8, each ceiling duct 122 or 123 extends to a rectangular enclosed thin space 131 or 132 which forms a right-half or left-half of the ceiling of the passenger cabin. More specifically, the right and left thin spaces 131 and 132 are positioned just above the afore-mentioned D-space and A-space of the passenger cabin of the vehicle, respectively.

A ceiling board of each thin space 131 or 132 is formed with a plurality of small openings 133 or 134. These openings 133 or 134 serve as an air inlet or air outlet as will become apparent as the description proceeds.

Each floor duct 124 or 125 extends under a rear seat 135 to a front portion of the same and has an air inlet 136 or 137 exposed to the D-space or A-space of the passenger cabin.

Each parcel shelf duct 126 or 127 extends to an air inlet 139 or 140 formed in a rear parcel shelf 138 of the vehicle.

Each air discharge duct 128 or 129 extends into a rear trunk room of the vehicle and connected to an air discharge opening (not shown) formed in the vehicle body. That is, the interior of the air discharge duct 128 or 129 is communicated with outside of the vehicle.

Referring back to FIG. 7, within each conditioning chamber 103 or 104 of the case 105, there are defined a main passage 150 or 151 through which air from the port 116 or 117 and the port 118 or 119 can flow to the port 114 or 115, and a bypass passage 152 or 153 which bypasses the main passage 150 or 151.

Within the main passage 150 or 151, there is installed a fan 154 or 155 of the electric fan device 110 and a part of the evaporator 111. The fan 154 or 155 forces to flow air from an inlet part of the main passage toward an outlet part of the same, and the evaporator 111 is positioned downstream of the fan 154 or 155 to cool air which flows in the main passage 150 or 151.

As shown, the two fans 154 and 155 for respective main passages 150 and 151 are driven by a common electric motor 156 controlled by a fan control device 157, and the evaporator 111 is exposed to both the two main passages 150 and 151.

The fan control device 157 for controlling the fan motor 156 is electrically connected to the control device 102.

The evaporator 111 has inlet and outlet openings which are connected through coolant feeding and returning pipes to inlet and outlet openings of a main evaporator of an automatic air conditioner (not shown) which is installed in a front portion of the vehicle.

An electromagnetic valve 158 is connected to the coolant feeding pipe. Thus, when the valve 158 is energized to assume its open condition, coolant is fed to the evaporator 111 and thus air passing through the main passage 150 or 151 is cooled by the evaporator 111.

Designated by numeral 159 is an electronic thermometer for protecting freezing of the evaporator 111. The thermometer 159 is connected to the control device 102, so that by analyzing informations from the thermometer 159, the control device 102 controls ON and OFF operations of the electromagnetic valve 158.

If desired, in place of the evaporator 111, a thermoelectric cooling device or the like may be used in the invention.

Each main passage 150 or 151 is equipped at the inlet part thereof with a filter 160 or 161 of the electric filtering device 112 or 113. Each air filtering device 112 or 113 is of a known electrostatic type which collects fine particles in air by using static electricity. Each air filtering device 112 is controlled by a controller 162 or 163 which is connected to the control device 102.

The first door 106 or 107 is pivotally connected to a downstream end of each main passage 150 or 151 and actuated by a first door actuator 164 or 165 which is controlled by the control device 102.

The first door 106 or 107 has two operative positions, one being the position indicated by reference "A" wherein the downstream end of the main passage 150 or 151 is communicated with the air discharge port 120 or 121 and at the same time the ceiling duct connecting port 114 or 115 is communicated with only the bypass passage 152 or 153, and the other position being the position as indicated by reference "B" wherein the air discharge port 120 or 121 is closed and at the same time the ceiling duct connecting port 114 or 115 is communicated with both the main and bypass passages 150 and 152 (or 151 and 153).

As will become apparent as the description proceeds, when the first door 106 or 107 assumes the position "A", air driven by the fan 154 or 155 is led into the air discharge port 120 or 121 and discharged to outside of the vehicle through the air discharge duct 128 or 129, and when the first door 106 or 107 assumes the position "B", air driven by the fan 154 or 155 is led into the ceiling duct connecting port 114 or 115 and into the ceiling duct 122 or 123 and blown into the D- or A-space of the passenger cabin from the small openings 133 or 134 of the ceiling board.

The second door 108 or 109 is pivotally connected to the case 105 near the ports 116 and 118 (or, 117 and 119) and actuated by a second door actuator 166 or 167 which is controlled by the control device 102.

The second door 108 or 109 has three operative positions, the first position being the position as indicated by reference "C" wherein an inlet part of the bypass passage 152 or 153 is closed, the second position being the position as indicated by reference "D" wherein the ports 116 and 118 (or, 117 and 119) are closed, and the third position being the position as indicated by reference "E" wherein the inlet part of the bypass passage 152 or 153 and the two ports 116 and 118 (or, 117 and 119) are all opened.

As will become apparent hereinafter, when the second door 108 or 109 is pivoted to the position "C" and thus closes the bypass passage 152 or 153, the floor duct connecting port 116 or 117 and the parcel shelf duct connecting port 118 or 119 become opened, so that air near the lower fron portion of the rear seat 135 and near the rear parcel shelf 138 is led into the main passage 150 or 151 through the floor duct 124 or 125 and the parcel shelf duct 126 or 127 respectively.

When the second door 108 or 109 is pivoted to the position "D" and thus closes the two ports 116 and 118 (or, 117 and 119), the inlet part of the bypass passage 152 or 153 becomes opened, so that, with the first door 106 or 107 assuming the position "A", air in the upper portion of each of the D-s and A-spaces of the passenger cabin is led through the ceiling duct 122 or 123 into the bypass passage 152 or 153 and then led into the main passage 150 or 151.

When the second door 108 or 109 is pivoted to the position "E" and thus opens the inlet part of the bypass passage 152 or 153 and the two ports 116 and 118 (or, 117 and 119), air near the lower front portion of the rear seat 135, near the rear parcel shelf 138 and near the ceiling is led into the main passage 150 or 151 through the ducts 124 or 125, 126 or 127, and 122 or 123.

Figure 9:
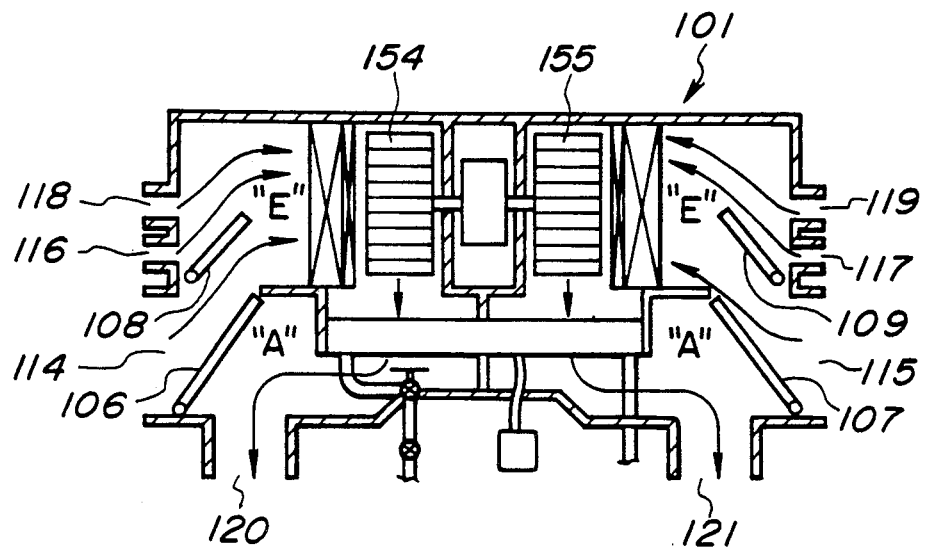
FIGS. 9 to 15 are drawings showing various operation conditions of the second embodiment.

That is, when, as shown in FIG. 9, the second door 108 or 109 assumes the position "E" and the first door 106 or 107 assumes the position "A", energization of the electric fan device 110 induces a ventilation mode wherein air from various portions of the passenger cabin is discharged to outside of the vehicle through the ceiling duct 122 or 123, the floor duct 124 or 125 and the parcel shelf duct 126 or 127. Under this mode, the passenger cabin is ventilated.

Figure 10:
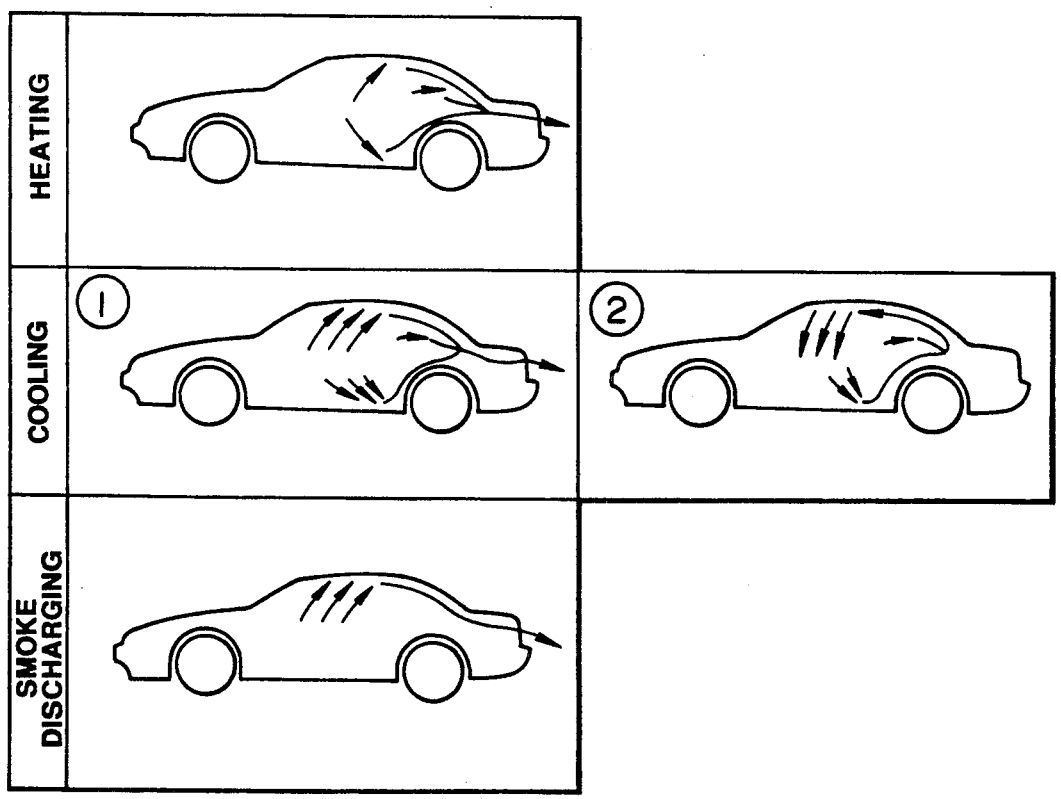
Figure 11:
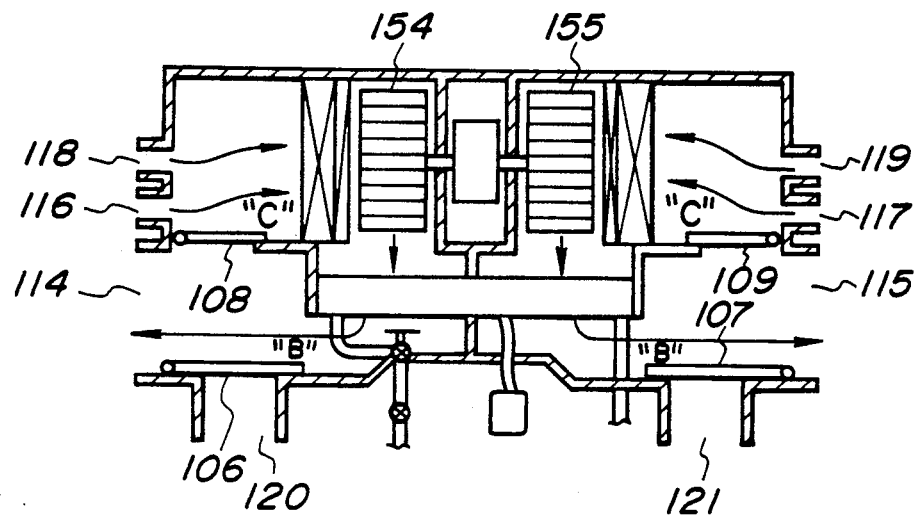
Figure 12:
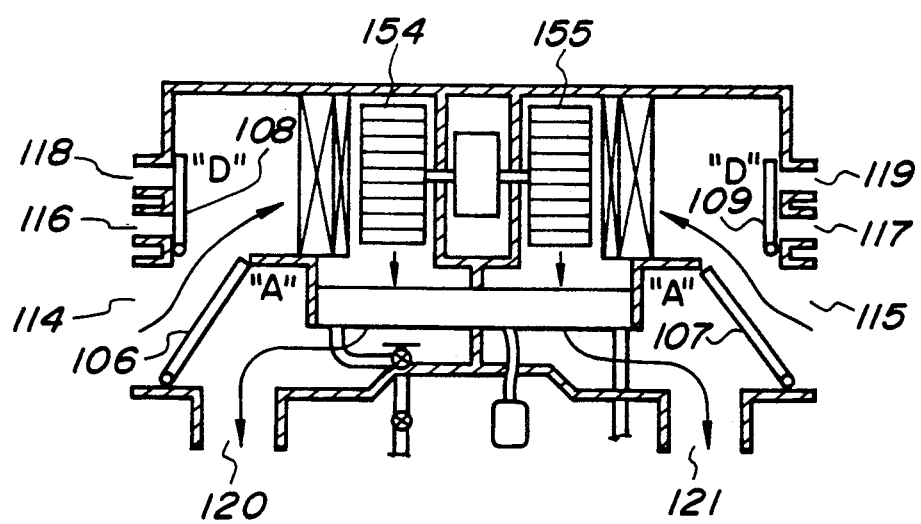

As is seen from FIG. 10, the ventilation mode can take place when the passenger room is under heating or cooling.

When the second door 108 or 109 assumes the position "C" and the first door 106 or 107 assumes the position "B", energization of the electric fan device 110 induces an air cooling mode wherein air near the front lower portion of the rear seat 135 and near the rear parcel shelf 138 is led through the floor duct 124 or 125 and the parcel shelf duct 126 or 127 into the main passage 150 or 151 and then into the ceiling duct 122 or 123 and blown into the passenger cabin from the openings 133 or 134 of the ceiling board. Under this condition, the evaporator 111 and the electric filtering device 112 or 113 are energized, so that air blown into the passenger cabin is cooled and cleaned.

When the second door 108 or 109 assumes the position "D" and the first door 106 or 107 assumes the position "A", energization of the electric fan device 110 induces a smoke discharge mode wherein air near the ceiling is discharged to outside of the vehicle through the ceiling duct 122 or 123, the bypass passage 152 or 153, the main passage 150 or 151 and the discharge duct (not shown).

Although not shown in the drawings, the pivotal movements of the first and second doors are carried out by first and second door electric actuators.

It is thus to be appreciated that in the second embodiment, there are provided two independent air conditioning lines "d" and "a" which are respectively applied to the A- and D-spaces of the passenger cabin, each system having the above-mentioned ventilation mode, air cooling mode and smoke discharge mode.

Figure 13:
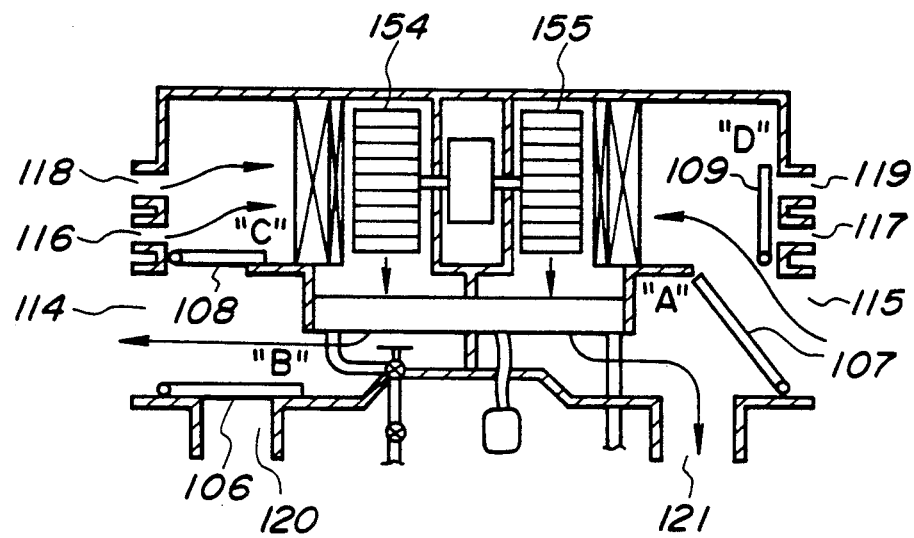
Figure 14:
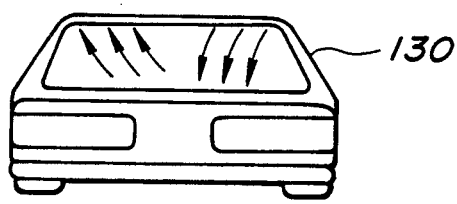

Thus, as is understood from the illustration of FIG. 13, in the second embodiment, a unique condition is obtained wherein one air conditioning line "d" or "a" is under air cooling mode and the other air conditioning line "a" or "d" is under smoke discharge mode. Under this condition, as is seen from FIG. 14, in D-space of the passenger cabin, cooled air is blown into the space from the small openings 133 of the ceiling board, while, in A-space of the cabin, contaminated air is sucked into the small openings 134 of the ceiling board for its discharging to outside of the vehicle.

Figure 15:
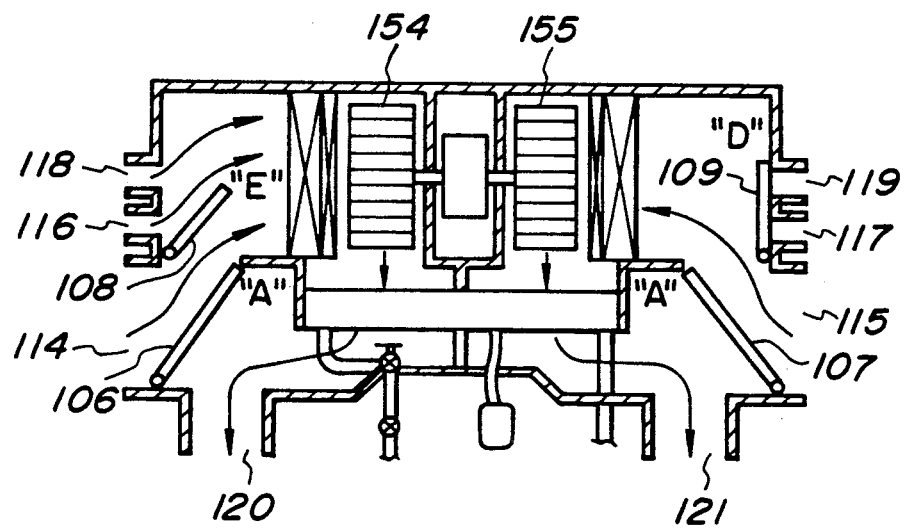

Furthermore, as is seen from FIG. 15, another unique condition is obtained wherein one air conditioning line "d" or "a" is under ventilation mode and the other air conditioning line "a" or "d" is under smoke discharge mode.

Referring back to FIG. 7, the air conditioning unit 101 having the above-mentioned structure is controlled by the control device 102.

The control device 102 includes a microcomputer. Informations from a front air conditioner control device 170, a front fan control device 171, two smoke sensors 172 and 173 and a control switch unit 174 are fed to the control device 102.

The front air conditioner control device 170 is a means for controlling operation of the front air conditioner which is installed in the front portion of the vehicle. Information signal representative of target temperature of air which is outputted from the front air conditioner is fed to the control device 102. By analyzing the information signal, the control device 102 judges whether the passenger cabin is under air cooling or air heating.

The front fan control device 171 is a means for controlling voltage applied to an electric fan motor (not shown) installed in the front air conditioner. Information signal representative of voltage applied to the fan motor is fed to the control device 102. By analyzing the information signal, the control device 102 judges whether the front air conditioner is under operation or not and detects the amount of air blown by the fan.

In the disclosed second embodiment, for achieving high, intermediate and low speed rotations of the front fan, there types of voltages, viz., high, intermediate and low voltages are selectively applied to the fan motor.

The smoke sensors 172 and 173 are of a known type which can sense tobacco or cigarette smoke. These sensors 172 and 173 are mounted in the respective ceiling spaces 131 and 132. Each smoke sensor 172 or 173 comprises a probe part, such as a photo detector, a gas detector or the like and a processing part which processes data from the probe part to judge whether the passenger cabin should be ventilated or not. Upon judgement of necessity of the ventilation, the processing part outputs a so-called "ventilation command signal" and a so-called "contamination representing signal" which is representative of degree of contamination of air in the passenger cabin. In the disclosed embodiment, in accordance with the degree of contamination of air in the passenger cabin, the smoke sensor outputs three types of information signals, which are signals representing high contaminated, intermediately contaminated and less contaminated air in the passenger cabin.

The control device 102 has a first (or automatic) control mode wherein operation of the air conditioning unit 101 is automatically controlled in accordance with the operation condition of the front air conditioner, a second (or synchronized) control mode wherein the two air conditioning lines "d" and "a" of the unit 101 are identically but automatically controlled in accordance with the operation of the front air conditioner and a third (or manual) control mode wherein the two air conditioning lines "d" and "a" of the unit 101 are independently controlled in the way manually set.

The control switch unit 174 is equipped with first, second and third push buttons 180, 181 and 182 which, when pushed, permit the control device 102 to assume the above-mentioned first (or automatic), second (or synchronized) and third (or manual) control modes respectively. The control switch unit 174 has further a fourth (or OFF) push button 183 which, when pushed, stops the operation of the air conditioning unit 101.

When the third (or manual) control mode is set, it becomes necessary to manually set the modes of the two air conditioning lines "d" and "a" of the air conditioning unit 101. For this, the control switch unit 174 is equipped with a DR button 184 which, when pushed, operates the air conditioning line "d" for D-space, an AS button 185 which, when pushed, operates the other air conditioning line "a" for A-space and a mode selection button 186 which, when pushed, selects the operation mode which the selected air conditioning line "d" or "a" should have. Furthermore, the control switch unit 174 has fun speed control buttons 187 and 188. When the button 187 is pushed, the speed of fun 154 or 155 is increased and when the other button 188 is pushed, the fun speed is lowered.

Furthermore, the control switch unit 174 is equipped with DP and AP buttons 189 and 190 for manually controlling the electric air filtering devices 112 and 113. That is, when the DP button 189 is pushed, the air filtering device 112 is operated, and when the AP button 190 is pushed, the other air filtering device 113 is operated.

Furthermore, the control switch unit 174 is equipped with a display device 191 on which the existing condition of the air conditioning unit 101 is picturized to allow the passengers to readily recognize the existing condition of the unit 101.

Upon receiving information signals from the control switch unit 174, the front air conditioner control device 170, the front fan control device 171, and the two smoke sensors 172 and 173, the control device 102 controls the air conditioning unit 101 in the following manner.

Figure 16:
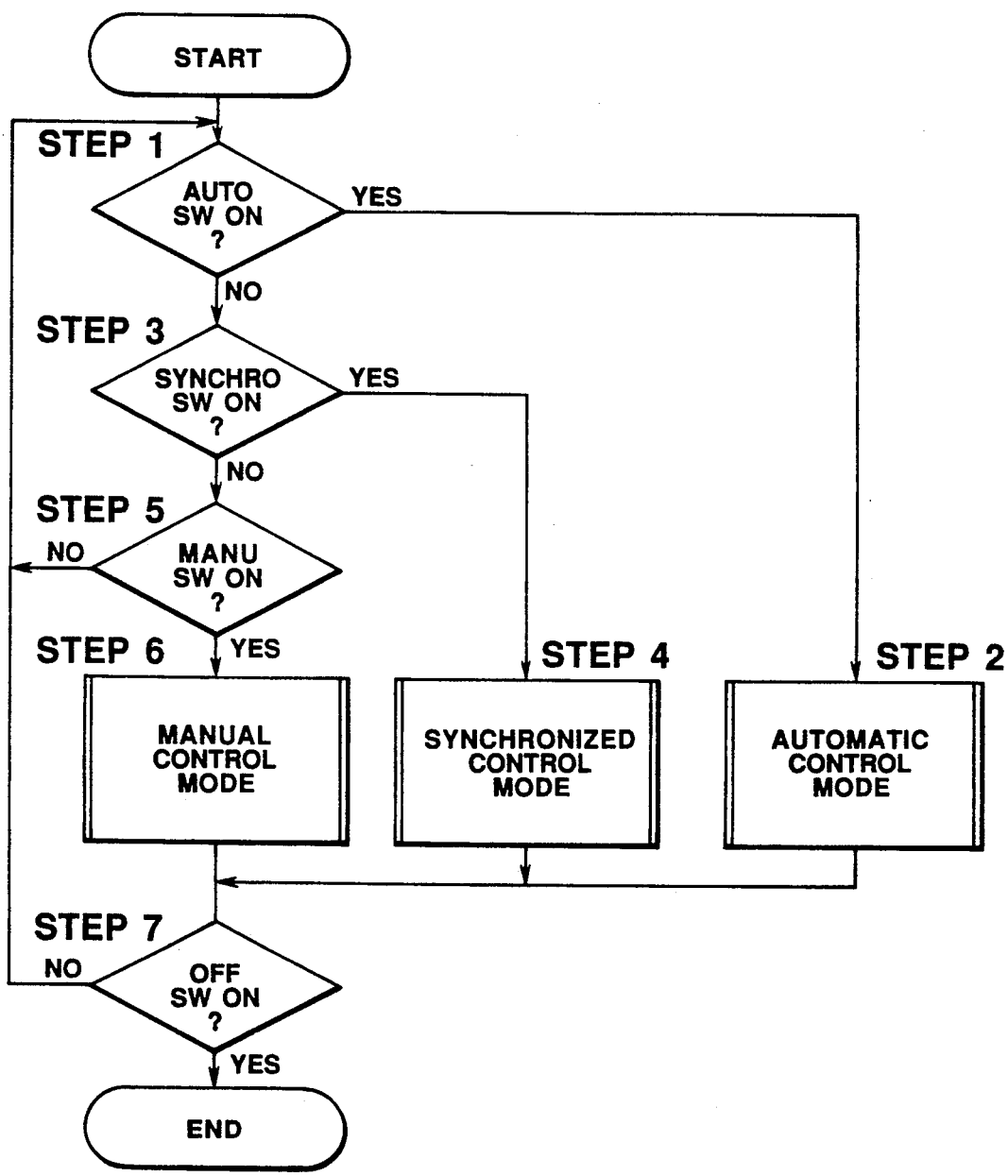
FIGS. 16 to 22 are flowcharts, each showing programmed operation steps carried out by a control device employed in the second embodiment of the invention.

The control device 102 determines one of first, second and third control modes by carrying out operation steps illustrated in a flowchart of FIG. 16.

That is, at step 1, a judgement is carried out as to whether the first push button 180 is pushed (ON) or not (OFF). If Yes, the control device 102 commands the air conditioning unit 101 to operate under the first control mode (step 2).

If No at step 1, the operation flow goes to step 3 at which a judgement is carried out as to whether the second push button 181 is pushed (ON) or not (OFF). If Yes, the control device 102 commands the air conditioning unit 101 to operate under the second control mode (step 4).

If No at step 3, the operation flow goes to step 5 at which a judgement is carried out as to whether the third push button 182 is pushed (ON) or not (OFF). If Yes, the control device 102 commands the unit 101 to operate under the third control mode (step 6).

If all of these buttons 180, 181 and 182 are not pushed, the operation flow goes back to step 1 and stands by until either one of the buttons is pushed.

When, due to ON operation of any push button 180, 181 or 182, the air conditioning unit 101 starts the operation under the selected control mode, this operation is continued until the fourth push button (viz., stop button) 183 is pushed. That is, when the button 183 is pushed, the electric fan device 110, the electronic thermometer 159, the electric air filtering devices 112 and 113 stop their operations, and the ventilation mode is set in both the air conditioning lines "d" and "a" of the unit 101 (step 7).

Figure 17:
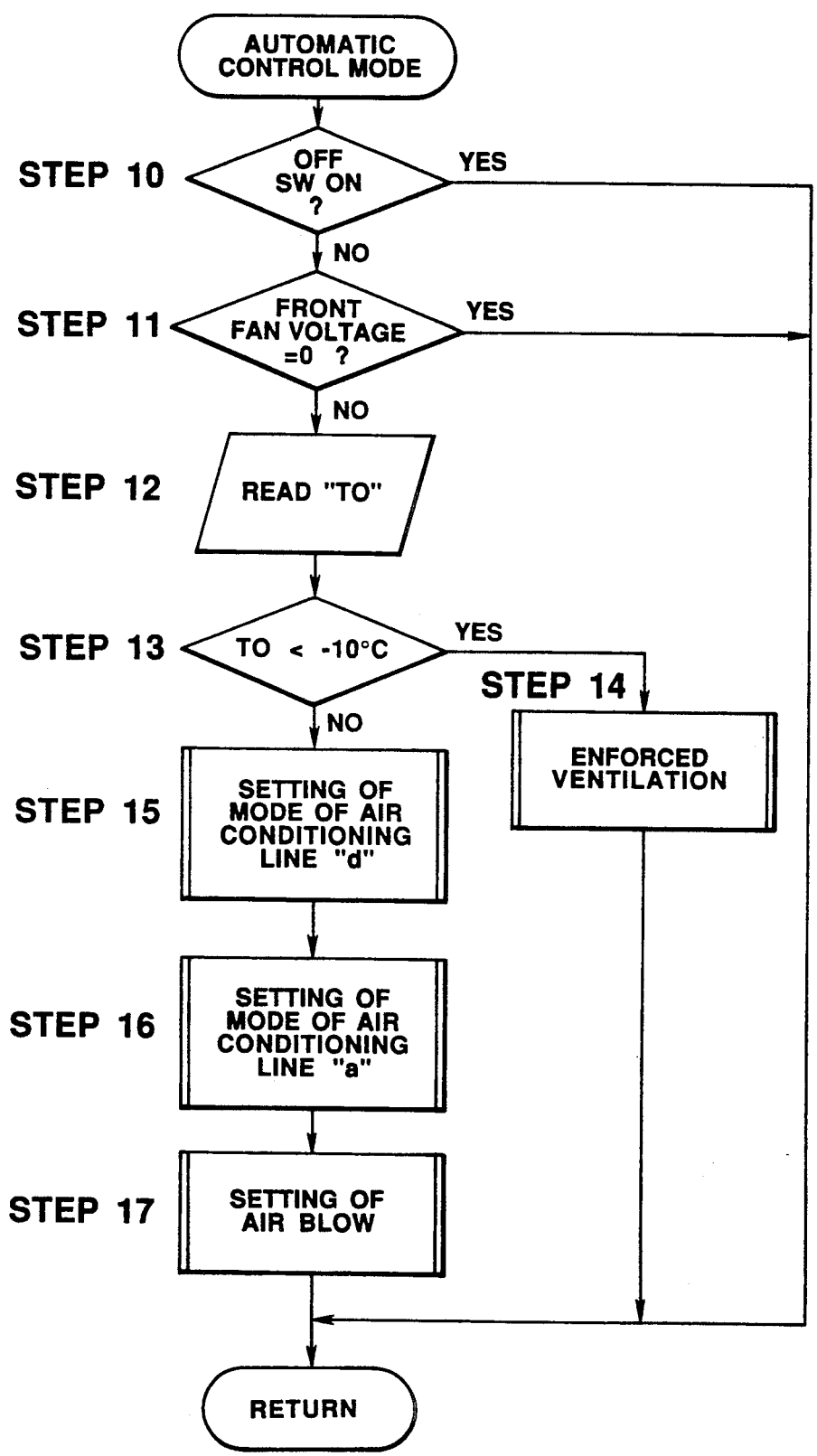

The first (or automatic) control mode will be described with reference to a flowchart of FIG. 17.

When the first push button 180 is pushed for selecting the first control mode of the control device 102, a judgement as to whether the fourth push button 183 is pushed or not (step 10) and a judgement as to whether the information signal from the front fan control device 171 represents that voltage applied to front electric fan motor is zero or not (step 11) are carried out. If Yes at either step 10 or step 11, the operation of the air conditioning unit 101 under the first control mode does not start. It is to be noted that "Yes" at step 11 means that the front air conditioner is not under operation.

If No at both steps 10 and 11, the control device 102 receives, from the front air conditioner control device 170, an information signal representative of target temperature "TO" of air which is blown from the front air conditioner (step 12).

Then, at step 13, a judgement is carried out as to whether the target temperature "TO" is lower than −10° C. (degrees) or not. If Yes, that is, if the front air conditioner control device 170 judges that a maximum cooling is needed, the first and second door actuators 164, 165, 166 and 167 are so controlled that both the air conditioning lines "d" and "a" of the air conditioning unit 101 assume the ventilation mode with the fans 154 and 155 rotating at the highest speed (step 14). It is to be noted that the need of the maximum cooling occurs when in summer the motor vehicle has been parked for a long time under the blazing sun. That is, when the first control mode is set in such motor vehicle, the very hot air in the passenger cabin is at first discharged to outside of the vehicle through the ceiling ducts 122 and 123, the floor ducts 124 and 125 and the parcel shelf ducts 126 and 127.

This condition will be understood from the left block (1) of the middle illustration of FIG. 10.

If No at step 13, that is, if the target temperature "TO" is higher than −10° C. (degrees), the operation mode of the air conditioning line "d" for the D-space and that of the air conditioning line "a" for the A-space are set in order (step 15 and step 16), and the fan control device 157 sets the voltage which is applied to the electric fan motor 156 thereby setting the air amount blown from the air conditioning unit 101 (step 17).

Figure 18:
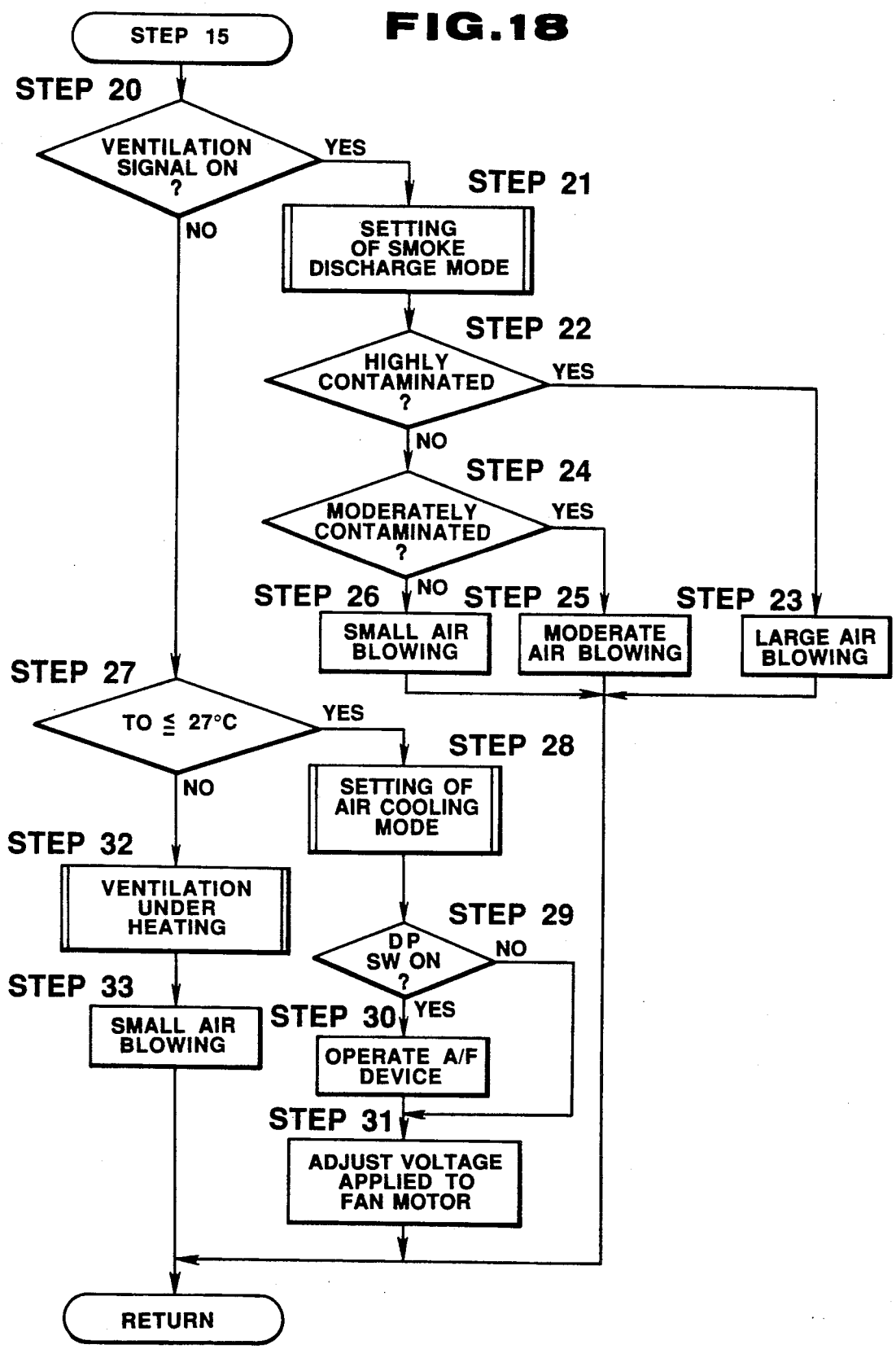
Figure 19:
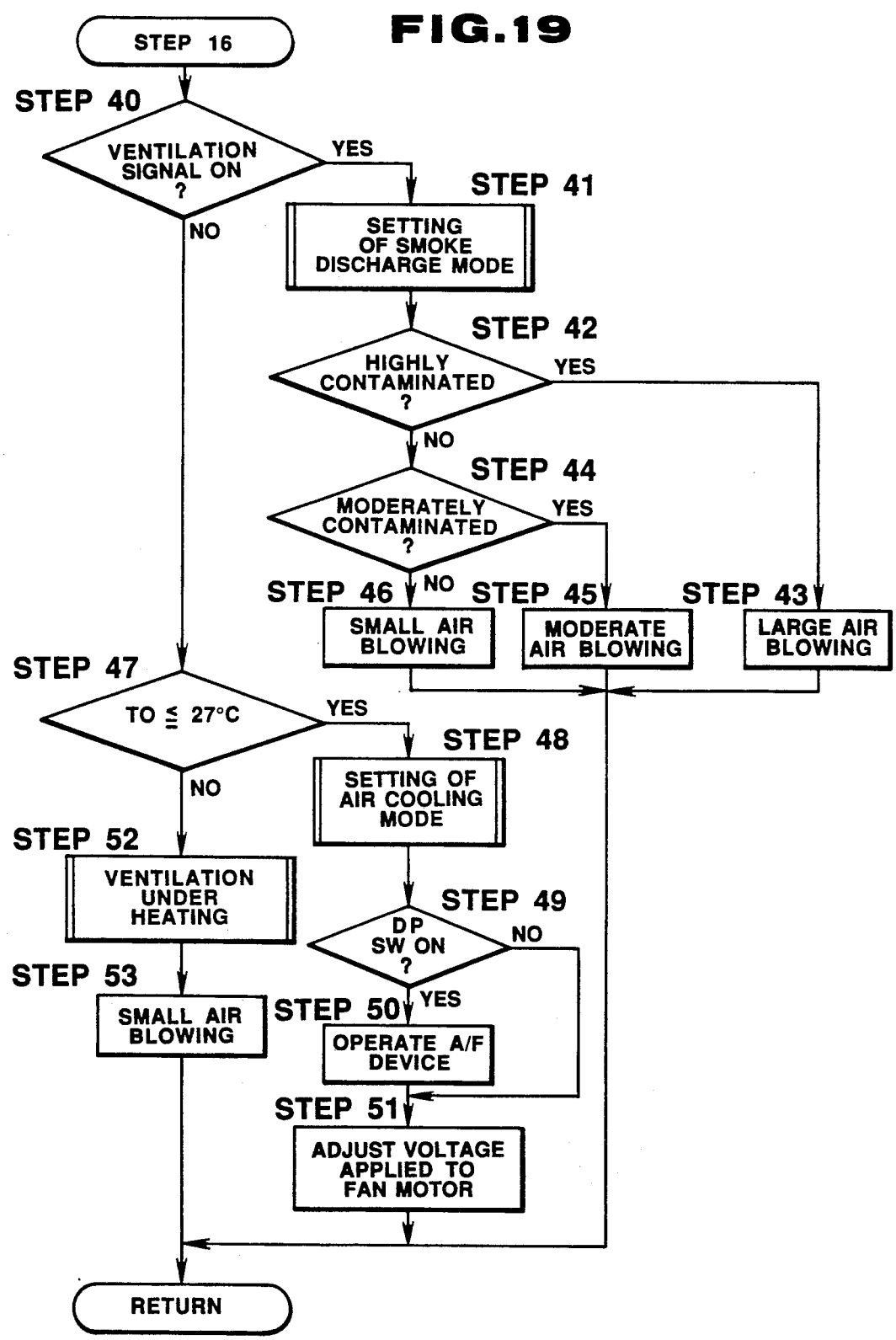

The setting of the operation modes of the two air conditioning lines "d" and "a" for the D- and A-spaces of the passenger cabin are carried out in a manner as is depicted in flowcharts of FIGS. 18 and 19 respectively. The setting of the air amount blown from the air conditioning unit 101 is carried out in a manner as is depicted by a flowchart of FIG. 20.

As is seen from the flowchart of FIG. 18, at step 20, the control device 102 judges whether the smoke sensor 172 outputs the "ventilation command signal" or not. If Yes, the first and second door actuators 164 and 166 are so controlled that the air conditioning line "d" for the D-space assumes the smoke discharge mode (step 21) wherein the first door 106 takes the position "A" and the second door 108 takes the position "D".

Then, at step 22, a judgement is carried out whether the smoke sensor 172 outputs a signal representing high contamination of air or not. If Yes, the operation flow goes to step 23 to memorize the necessity of running the electric fan motor 156 at a high speed.

If No at step 22, the operation flow goes to step 24 at which a judgement is carried out whether the smoke sensor 172 outputs a signal representing an intermediate contamination of air or not. If Yes, the operation flow goes to step 25 to memorize the necessity of running the electric fan motor 156 at a middle speed.

If No at step 24, the operation flow goes to step 26 to memorize the necessity of running the electric fan motor 156 at a low speed.

Thus, when the D-space of the passenger cabin is contaminated with smoke, the contaminated air in the D-space is enforcedly discharged to outside of the vehicle from the ceiling openings 133 at a speed determined by the rotation speed of the fan motor 156 which will be described hereinafter.

In the disclosed embodiment, for obtaining the high, middle and low speeds of the electric fan motor 156, the motor 156 is applied with voltages of 12 V, 8 V and 5 V as will be described in detail hereinafter.

If No at step 20, that is, if the ventilation command signal is not issued from the smoke sensor 172, the operation flow goes to step 27 at which a judgement is carried out as to whether the target temperature "TO" is lower than 27° C. (degrees) or not. That is, a judgement is made as to whether the passenger cabin is under air cooling or air heating.

If Yes, that is, when the passenger cabin is under air cooling, the operation flow goes to step 28. At this step, the first and second door actuators 164 and 166 are so controlled that the air conditioning line "d" for the D-space assumes the air cooling mode wherein the first door 106 takes the position "B" and the second door takes the position "C". Furthermore, the electromagnetic valve 158 is opened to operate the evaporator 111.

Then, the control device 102 judges, by analyzing information signals issued from the DP switch 189 of the control switch unit 174, whether the electric air filtering device 112 should be operated or not (steps 29 and 30).

Then the operation flow goes to step 31 to memorize the necessity of matching the air amount blown by the air conditioning unit 101 with that blown by the front air conditioner. More specifically, in accordance with the voltage representing signal issued from the front air conditioner control device 171, a mode is memorized wherein corresponding voltage "VD" should be applied to the electric fan motor 156.

The air cooling mode will be understood from the right block (2) of the middle illustration of FIG. 10.

Thus, when, due to execution of the aforementioned enforced ventilation under the air cooling mode, the temperature of air in the passenger cabin becomes to the level of the outside air and when the target temperature "TO" of air blown from the front air conditioner becomes within the range from $-10°$ C. to 27° C., air in the D-space of the passenger cabin is sucked to the D-conditioning chamber 103 through the floor duct 124 and the parcel shelf duct 126, then cooled by the evaporator 111, cleaned by the air filtering device 112 (when energized) and then fed to the ceiling duct 122 and finally blown into the D-space from the ceiling openings 133. The rotation speed of the fan motor 156 in this condition is determined in a manner as will be described hereinafter.

If No at step 27, the operation flow goes to step 32. At this step, the first and second door actuators 164 and 166 are so controlled that the air conditioning line "d" for the D-space assumes the ventilation mode wherein the first door 106 takes the position "A" and the second door 108 takes the position "E". Furthermore, the control device 102 memorizes the necessity of applying the electric fan motor 156 with a smaller voltage (viz., 5 volt) for running the same at a low speed.

Thus, as will be understood from the upper illustration of FIG. 10, when, under this condition, the fan motor 156 is energized, air in the D-space of the passenger cabin is discharged to outside of the vehicle but slowly though the ceiling duct 122, the floor duct 124 and the parcel shelf duct 126. That is, under such condition, a small ventilation is carried out under air heating in the passenger cabin.

Then, the control device 102 functions to set a mode of the other air conditioning line "a" for the A-space of the passenger cabin.

As is seen from the flowchart of FIG. 19, at step 40, the control device 102 judges whether the smoke sensor 173 outputs the "ventilation command signal" or not. If Yes, the first and second door actuators 165 and 167 are so controlled that the air conditioning line "a" for the A-space assumes the smoke discharge mode (step 41) wherein the first door 107 takes the position "A" and the second door 109 takes the position "D".

Then, at step 42, a judgement is carried out whether the smoke sensor 173 outputs a signal representing high contamination of air or not. If Yes, the operation flow goes to step 43 to memorize the necessity of running the electric fan motor 156 at a high speed.

If No at step 42, the operation flow goes to step 44 at which a judgement is carried out whether the smoke sensor 173 outputs a signal representing an intermediate contamination of air or not. If Yes, the operation flow goes to step 45 to memorize the necessity of running the electric fan motor 156 at a middle speed.

If No at step 44, the operation flow goes to step 46 to memorize the necessity of running the electric fan motor 156 at a low speed.

Thus, when the A-space of the passenger cabin is contaminated with smoke, the contaminated air in the A-space is enforcedly discharged to outside of the vehicle from the ceiling openings 134 at a speed determined by the rotation speed of the fan motor 156 which will be described hereinafter.

If No at step 40, that is, if the ventilation command signal is not issued from the smoke sensor 173, the operation flow goes to step 47 at which a judgement is carried out as to whether the target temperature "TO" is lower than 27° C. (degrees) or not. That is, a judgement is made as to whether the passenger cabin is under air cooling or air heating.

If Yes, that is, when the passenger cabin is under air cooling, the operation flow goes to step 48. At this step, the first and second door actuators 165 and 167 are so controlled that the air conditioning line "a" for the A-space assumes the air cooling mode wherein the first door 107 takes the position "B" and the second door 109 takes the position "C". Furthermore, the electromagnetic valve 158 is opened to operate the evaporator 111.

Then, the control device 102 judges, by analyzing information signals issued from the AP switch 190 of the control switch unit 174, whether the electric air filtering device 113 should be operated or not (steps 49 and 50).

Then the operation flow goes to step 51 to memorize the necessity of matching the air amount blown by the air conditioning unit 101 with that blown by the front air conditioner. More specifically, in accordance with the voltage representing signal issued from the front air conditioner control device 171, a mode is memorized wherein corresponding voltage "VA" should be applied to the electric fan motor 156.

The air cooling mode will be understood from the right block (2) of the middle illustration of FIG. 10.

Thus, when, due to execution of the aforementioned enforced ventilation under the air cooling mode, the temperature of air in the passenger cabin becomes to the level of the outside air and when the target temperature "TO" of air blown from the front air conditioner becomes within the range from $-10°$ C. and 27° C., air in the A-space of the passenger cabin is sucked to the A-conditioning chamber 104 through the floor duct 125 and the parcel shelf duct 127, then cooled by the evaporator 111 and cleaned by the air filtering device 113 and then blown into the A-space from the ceiling openings 134. The rotation speed of the fan motor 156 in this condition is determined in a manner as will be described hereinafter.

If No at step 47, the operation flow goes to step 52. At this step, the first and second door actuators 165 and 167 are so controlled that the air conditioning line "a" for the A-space assumes the ventilation mode wherein the first door 107 takes the position "A" and the second door 109 takes the position "E". Furthermore, the control device 102 memorizes the necessity of applying the electric fan motor 156 with a smaller voltage (viz., 5 volt) for running the same at a low speed.

Thus, as will be understood from the upper illustration of FIG. 10, when, under this condition, the fan motor 156 is energized, air in the A-space of the passenger cabin is discharged to outside of the vehicle but slowly though the ceiling duct 123, the floor duct 125 and the parcel shelf duct 127. That is, under such condition, a small ventilation is carried out under air heating in the passenger cabin.

Figure 20:
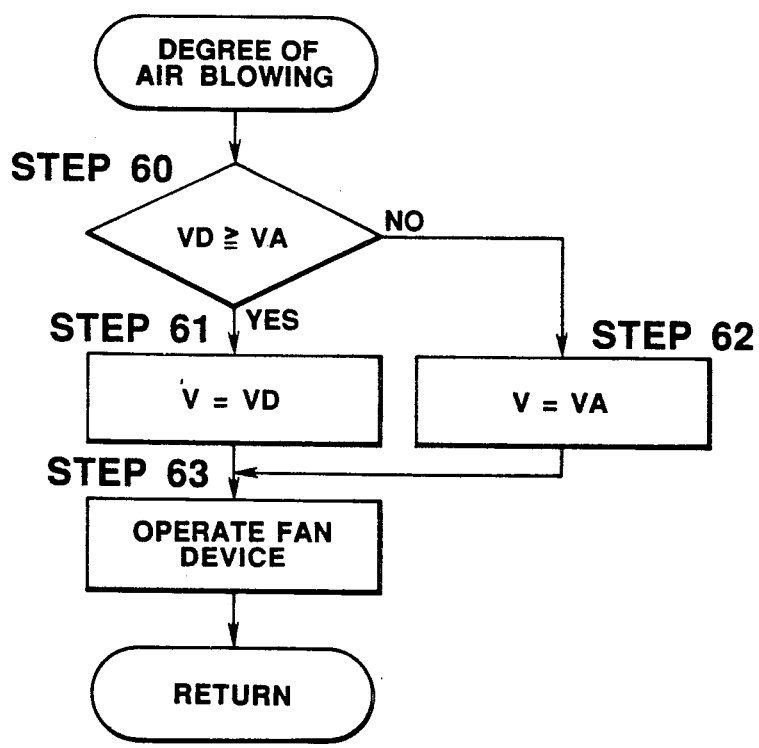

When the respective modes of the two air conditioning lines "d" and "a" for the D-space and A-space are set in the above-mentioned manner, the control device 102 determines the amount of air to be blown by the electric fan device 110 by carrying out the steps shown in the flowchart of FIG. 20.

That is, at step 60, a judgement is carried out as to whether the "VD" is greater than "VA" or not. If Yes, the operation flow goes to step 61 to determine that the voltage applied to the electric fan motor 156 should be "VD". If No, the operation flow goes to step 62 to determine that the voltage applied to the motor 156 should be "VA". At step 63, the fan motor 156 is energized to run with the selected higher voltage.

In the manner as has been described hereinabove, the first (or automatic) control mode is carried out.

Figure 21:
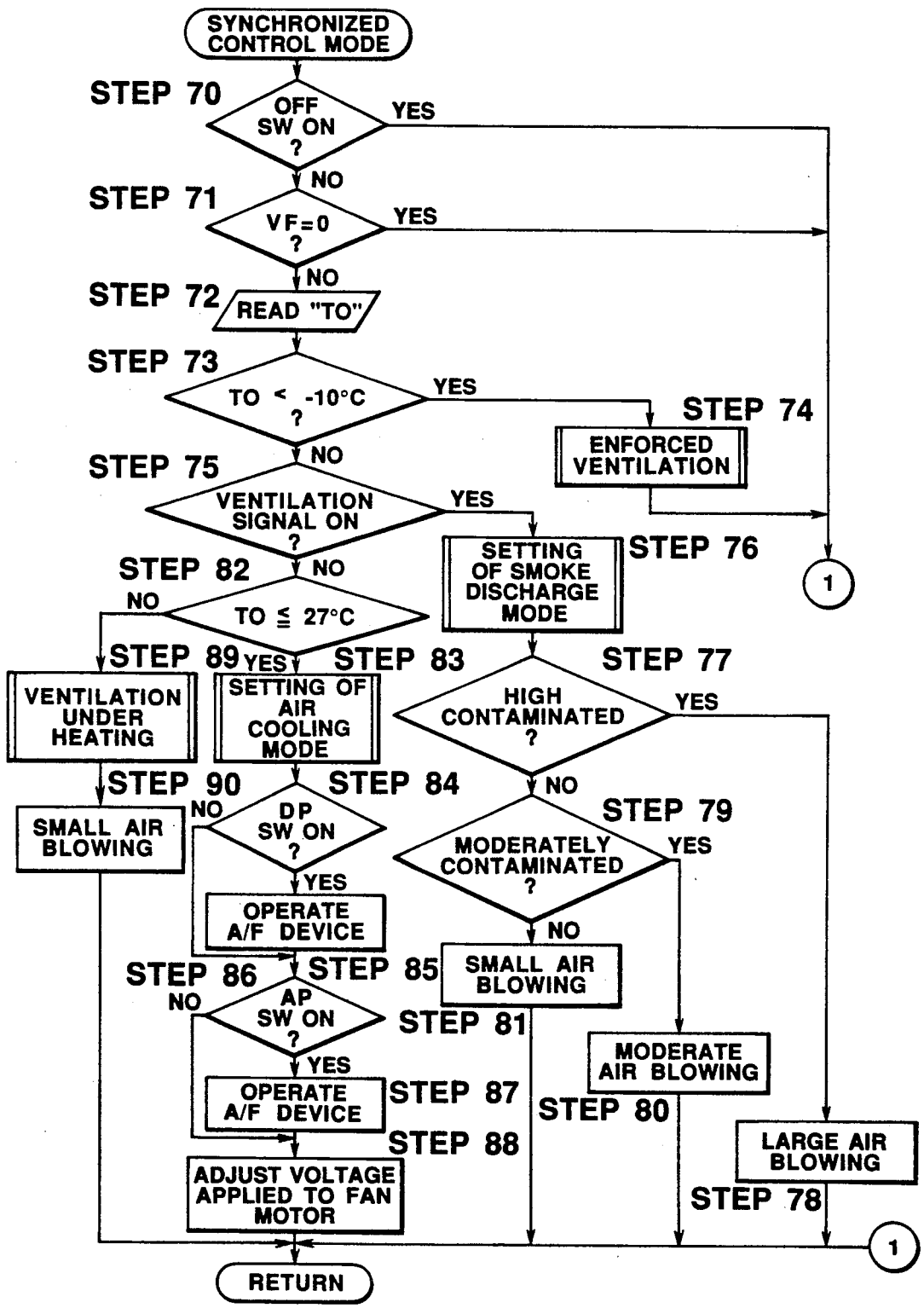

In the following, the second (or synchronized) control mode will be described with reference to a flowchart of FIG. 21.

When the second push button 181 of the control switch unit 174 is pushed for selecting the second control mode of the control device 102, a judgement (step 70) as to whether the fourth (or OFF) push button 183 is pushed or not and a judgement (step 71) as to whether the information signal from the front fan control device 171 represents that voltage applied to front electric fan motor is zero or not are carried out. If Yes at either step 70 or step 71, the operation of the air conditioning unit 101 under the second control mode does not start. It is to be noted that "Yes" at step 70 means that the front air conditioner is not under operation.

If No at both steps 70 and 71, the control device 102 receives, from the front air conditioner control device 170, an information signal representative of target temperature "TO" of air which is blown from the front air conditioner (step 72).

Then, at step 73, a judgement is carried out as to whether the target temperature "TO" is lower than −10° C. (degrees) or not. If Yes, that is, if the front air conditioner control device 170 judges that a maximum cooling is needed, enforced ventilation identical to that of step 14 of the aforementioned first control mode is carried out (step 74). It is to be noted that the need of the maximum cooling occurs when in summer the motor vehicle has been parked for a long time under the blazing sun. That is, when the second control mode is set in such a motor vehicle, the very hot air in the passenger cabin is at first discharged to outside of the vehicle through the ceiling ducts 122 and 123, the floor ducts 124 and 125 and the parcel shelf ducts 126 and 127. This condition will be understood from the left block (1) of the middle illustration of FIG. 10.

If No at step 73, that is, if the target temperature "TO" is higher than −10° C. (degrees), the operation flow goes to step 75 at which a judgement is carried out as to whether either one of the smoke sensors 172 and 173 outputs the "ventilation command signal" or not. If Yes, the first and second door actuators 164 and 166 (or 165 and 167) for each air conditioning line "d" or "a" are so controlled that each air conditioning line "d" or "a" for D-space (or A-space) assumes the smoke discharge mode (step 76) wherein the first door 106 or 107 takes the position "A" and the second door 108 or 109 takes the position "D".

Then, at step 77, a judgement is carried out as to whether the smoke sensor 172 or 173 outputs a signal representing high contamination of air or not. If Yes, the operation flow goes to step 78 for running the electric fan motor 156 at a high speed. Under this, the motor 156 is applied with a voltage of 12 V.

If No at step 77, the operation flow goes to step 79 at which a judgement is carried out as to whether the smoke sensor 172 or 173 outputs a signal representing an intermediate contamination of air or not. If Yes, the operation flow goes to step 80 for running the electric fan motor 156 at a middle speed. Under this, a voltage of 8 V is applied to the motor 156.

If No at step 79, the operation flow goes to step 81 for running the the electric fan motor 156 at a low speed. Under this, a voltage of 5 V is applied to the motor 156.

Thus, when, under the second control mode, at least one of the D-space and A-space of the passenger cabin is contaminated with smoke, air in the passenger cabin is enforcedly discharged to outside of the vehicle from the ceiling openings 133 and 134 at a speed determined by the contamination degree of the air.

If No at step 75, that is, if the ventilation command signal is not issued from either of the smoke sensors 172 and 173, the operation flow goes to step 82 at which a judgement is carried out as to whether the target temperature "TO" is lower than 27° C. (degrees) or not. That is, a judgement is made as to whether the passenger cabin is under air cooling or air heating.

If Yes, that is, when the passenger cabin is under air cooling, the operation flow goes to step 83. At this step, the first and second door actuators 164 and 166 (or 165 and 167) are so controlled that each air conditioning line "d" or "a" for D-space or A-space assumes the air cooling mode wherein the first door 106 or 107 takes the position "B" and the second door 108 or 109 takes the position "C". Furthermore, the electromagnetic valve 158 is opened to operate the evaporator 111.

Then, the control device 102 judges by analyzing information signals from the DP switch 189 and AP switch 190 of the control switch unit 174, whether the electric air filtering devices 112 and 113 should be operated or not (step 84 to step 87).

Then the operation flow goes to step 88 for matching the air amount blown by the air conditioning unit 101 with that blown by the front air conditioner. More specifically, in accordance with the voltage representing signal issued from the front air conditioner control device 171, a corresponding voltage is applied to the electric fan motor 156.

Thus, when, due to execution of the aforementioned enforced ventilation or the like, under the air cooling mode, the temperature of air in the passenger cabin becomes to the level of the outside air and when the target temperature "TO" of air blown from the front air conditioner becomes within the range from −10° C. to 27° C., air in the passenger cabin is sucked into both the D- and A-conditioning chambers 103 and 104 through the floor ducts 124 and 125 and the parcel shelf ducts 126 and 127, then cooled by the evaporator 111, cleaned by the air filtering devices 112 and 113 (when energized) and then fed to the ceiling ducts 122 and 123 and finally blown into the passenger cabin from the ceiling openings 133 and 134.

If No at step 82, the operation flow goes to step 89 judging that the passenger cabin is under air heating. At this step, the first and second door actuators 164 and 166 and 165 and 167 are so controlled that each air conditioning line "d" or "a" for the D-space or A-space assumes the ventilation mode wherein the first door 106 or 107 takes the position "A" and the second door 108 or 109 takes the position "E".

Then, at step 90, the control device 102 functions to apply the electric fan motor 156 with a smaller voltage (viz., 5 volt) for running the same at a low speed.

Thus, as will be understood from the upper illustration of FIG. 10, when, under this condition, the fan motor 156 is energized, air in the passenger cabin is discharged to outside of the vehicle but slowly through the ceiling ducts 122 and 123, the floor ducts 124 and 125 and the parcel shelf ducts 126 and 127.

In the manner as has described hereinabove, the second (or synchronized) control mode is carried out.

Figure 22:
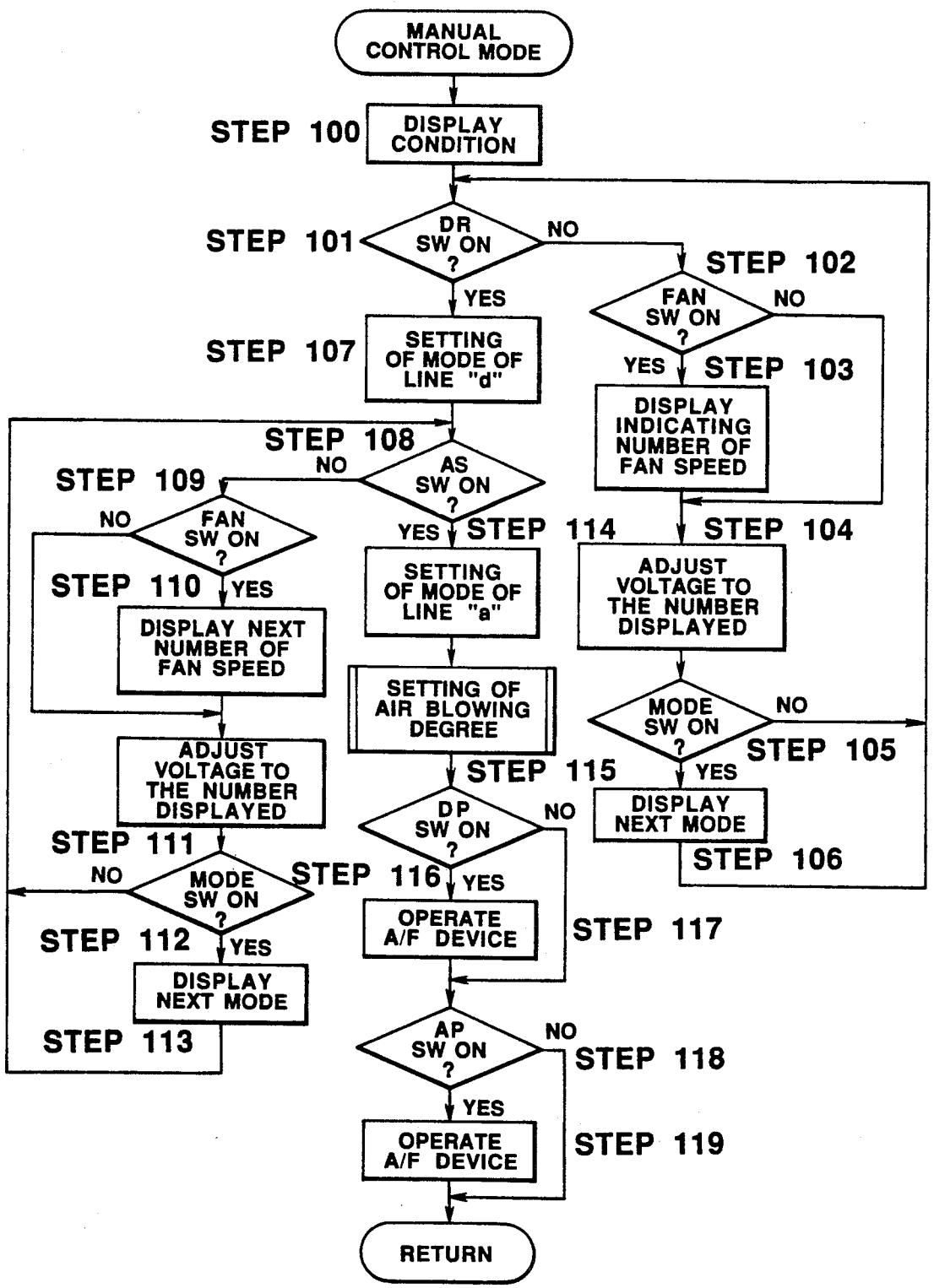

In the following, the third (or manual) control mode will be described with reference to a flowchart of FIG. 22.

When the third push button 182 of the control switch unit 174 is pushed for selecting the third (or manual) control mode of the control device 102, the display device 191 picturizes thereon the existing condition of the air conditioning unit 101 (step 100).

Then at step 101, a judgement is carried out as to whether the DR button 184 is pushed or not. If No, the operation flow goes to step 102 at which a judgement is carried out as to whether either one of the fun speed control buttons 187 and 188 is pushed or not. If Yes at step 102, the display device 191 displays a number "1", "2" or "3" which indicates the voltage "VD" to be applied to the electric fan motor 156 (step 103). At step 104, the voltage "VD" thus indicated is memorized. If No at step 102, the operation flow goes bypasses the step 103.

In the disclosed embodiment, the numbers "1", "2" and "3" indicate the voltage of 5 V, 8 V and 12 V respectively.

At step 105, a judgement is carried out as to whether the mode selection button 186 is pushed or not. If Yes, the display device 191 displays the mode (viz., ventilation mode, cooling mode or heating mode) which is then selected (step 106). Then the operation flow goes back to step 101. If No at step 105, the operation flow goes back to step 101.

The operation from the step 102 to step 106 repeats until the DR button 184 is pushed.

When now the DR button 184 is pushed, the air conditioning line "d" for the D-space is set to carry out the mode which is then displayed on the display device 191 (step 107).

Then, at step 108, a judgement is carried out as to whether the AR button 185 is pushed or not. If No, the operation flow goes to step 109 at which a judgement is carried out as to whether either one of the fun speed control buttons 187 and 188 is pushed or not. If Yes at step 109, the display device 191 displays thereon a number "1", "2" or "3" which indicates the voltage "VA" to be applied to the electric fan motor 156 (step 110). At step 111, the voltage "VA" thus indicated is memorized. If No at step 109, the operation flow bypasses the step 110.

At step 112, a judgement is carried out as to whether the mode selection button 186 is pushed or not. If Yes, the display device 191 displays the mode (viz., ventilation mode, cooling mode or heating mode) which is then selected. Then, the operation flow goes back to step 108. If No at step 112, the operation flow goes back to step 108.

The operation from the step 109 to step 113 repeats until the AR button 185 is pushed.

When now the AR button 185 is pushed, the air conditioning line "a" for the A-space is set to carry out the mode which is then displayed on the display device 191 (step 114).

Then at step 115, the voltage applied to the fan motor 156 is determined by comparing the voltage "VD" (step 104) and the voltage "VD" (step 111) which have been memorized. That is, this step 115, the fan motor 156 is energized to run with a selected higher voltage "VD" or "VA".

Then, in accordance with the conditions of the DP and AP buttons 189 and 190, the control device 102 sets the conditions of the air filtering devices 112 and 113. With this, the air conditioning unit 101 is controlled to operate under the mode which the driver (or passenger) has manually selected (steps 116 to 119).

As will be understood from the foregoing description, when, in the second embodiment, the first control mode (or automatic control mode) is selected, the two air conditioning lines "d" and "a" carry out the ventilation and air-cooling independently in accordance with the condition of the front air conditioner. However, the enforced ventilation is carried out independently of the front air conditioner.

When the second control mode (or synchronized control mode) is selected, the two air conditioning lines "d" and "a" carry out the ventilation and air-cooling in a synchronized or identical manner in accordance with the condition of the front air conditioner.

Furthermore, when the third control mode (or manual control mode) is selected, the two air conditioning lines "d" and "a" carry out the ventilation and air-cooling independently of the condition of the front air conditioner.

In the following, advantages of the second embodiment of the present invention will be described.

When the air conditioning unit 101 assumes the air-heating mode, air in the passenger cabin is slowly discharged to outside of the vehicle from the ceiling openings 133 and 134, the floor duct openings 136 and 137 and the parcel shelf duct openings 139 and 140. This means that air in every portions of the passenger cabin is smoothly and evenly discharged to outside of the vehicle. Thus, it never occurs that the hot air blown from outlets of the front air conditioner is directed hard toward the heads of passengers.

Under the air-heating mode, the hot air is forced to flow near foots of the passengers due to the air sucking by the floor duct openings 136 and 137.

Due to air discharging from various portions of the passenger cabin, generation of many hot air pockets in the cabin does not occur. This is very advantageous when considering that such air pockets tend to produce undesirable mist on various portions of the windows of the vehicle.

When the need of the maximum cooling occurs when particularly in summer the motor vehicle has been parked for a long time under the blazing sun, the enforced ventilation takes place prior to starting the air-cooling of the passenger cabin. Under the enforced ventilation, the very hot air in the passenger cabin is enforcedly discharged to outside of the vehicle from the ceiling openings 133 and 134, the floor duct openings 136 and 137 and the parcel shelf duct openings 139 and 140, so that the temperature of air in the cabin can be quickly lowered to the level of the outside air. Thus, the subsequent air cooling operation is effectively carried out by the air conditioning unit 101. During this cooling, air in the cabin is sucked from the floor duct openings 136 and 137 and the parcel shelf duct openings 139 and 140, cooled by the evaporator 111, cleaned by the air filtering devices 162 and 163 and blown into the passenger cabin from the ceiling openings 133 and 134. This air cooling is carried out in cooperation with that of the front air conditioner.

When the passenger cabin is contaminated with cigarette smoke or the like, the smoke discharge mode is automatically carried out wherein air near the ceiling is discharged to outside of the vehicle through the ceiling duct openings 133 and 134.

In the first control mode (viz., automatic control mode), the ventilation, air-cooling and smoke discharge can be carried out independently in each air conditioning line "d" or "a". Thus, when, under air-cooling, the driver begins to smoke, only the air conditioning line "d" for the D-space changes its mode to the smoke discharge mode. Under this, air in the D-space is sucked into the ceiling openings 133 and discharged to outside of the vehicle, and cooled air is kept blown into the A-space from the other ceiling openings 134. This means that, in the passenger cabin, there is produced a flow of cooled air from a clean side (viz., A-space) to a contaminated side (viz., D-space), and thus, the passengers in the A-space is protected from the smoke attack.

In the following, modifications of the second embodiment will be briefly described.

Although, in the foregoing description, the given spaces are described to be the right-half space (viz., "D-space") of the passenger cabin and the left-half space (viz., "A-space") of the same, these given spaces may be a front-half space of the passenger cabin and a rear-half space of the same.

Although, in the foregoing description, the running of the two fans 154 and 155 for the respective air conditioning lines "d" and "a" is effected by a common electric fan motor 156, the fans 154 and 155 may be powered by respective motors. Furthermore, in place of using a common evaporator 111 for the two lines "d" and "a", respective evaporators may be used in the lines.

In the foregoing description, three fan speeds (viz., "1", "2" and "3") are described available. If desired, more than three speeds may be provided for achieving much more precise air conditioning of the passenger cabin.

In the foregoing, the information signal issued by the front air conditioner control device 170 is used for judging whether the passenger cabin is under air cooling or air heating. If desired, a temperature sensor may be used for carrying out such judging.

What is claimed is:

1. An air conditioning system for use with an automatic air conditioner installed in a motor vehicle, comprising:
    a first duct extending to a ceiling of a passenger cabin of the vehicle and having an opening which is exposed to an upper portion of said passenger cabin;
    a second duct extending along a floor of the vehicle and having an opening which is exposed to a lower portion of the passenger cabin;
    an air conditioning unit having an electric fan and an evaporator installed therein, said unit being connected to said first and second ducts and having first, second and third operation modes, said first operation mode being a mode in which, under operation of said electric fan, air in the passenger cabin is forced to be sucked into said unit through said first and second ducts and discharged to outside of the vehicle, said second operation mode being a mode in which, under operation of said electric fan, air in the passenger cabin is sucked into said unit through said second duct, cooled by said evaporator, fed to said first duct and blown into said passenger cabin from said opening of said first duct, and said third operation mode being a mode in which contaminated air is sucked into said unit from said opening of said first duct and discharged to outside of the vehicle;
    sensor means for producing information signals which are representative of conditions of the passenger cabin; and
    a control device for permitting said air conditioning unit to select one of said first, second and third operation modes in accordance with information signals issued from said sensor means and for controlling the speed of said electric fan in accordance with the information signals issued from said sensor means and those issued from a front fan control device which controls the speed of an electric fan installed in said automatic air conditioner.

2. An air conditioning system as claimed in claim 1, further comprising:
    pipe means for fluidly connecting said evaporator with an evaporator installed in said automatic air conditioner; and
    an electromagnetic valve means connected to said pipe means for selectively opening and closing said pipe means in accordance with an instruction signal produced by said control device.

3. An air conditioning system as claimed in claim 2, in which said sensor means comprises:
    an outside air temperature sensor which senses the temperature of outside of the vehicle;
    an inside air temperature sensor which senses the temperature of air in the passenger cabin; and
    a smoke sensor which can sense contamination of air floating in the passenger cabin.

4. An air conditioning system as claimed in claim 3, in which said control device comprises:
    first means for permitting said air conditioning unit to assume said third operation mode when said smoke sensor issues a signal which represents a marked contamination of air in the passenger cabin;
    second means for permitting said air conditioning unit to assume said first operation mode when, by analyzing an information signal issued from said outside air temperature sensor, judging that the passenger cabin is under air heating due to operation of said automatic air conditioner; and
    third means for permitting said air conditioning unit to assume said second operation mode when, by analyzing an information signal issued from said inside air temperature sensor, judging that the passenger cabin is not needed to be ventilated.

5. An air conditioning system as claimed in claim 4, in which when judging that the passenger cabin should be highly ventilated by analyzing the information signal from said inside air temperature sensor, said third means causes said air conditioning unit to assume said first operation mode having said electric fan run at a higher operation speed.

6. An air conditioning system as claimed in claim 5, further comprising an electric air filtering device, said air filtering device being operated to filter air which is blown into said passenger cabin from the opening of said first duct under said second operation mode of said air conditioning unit.

7. An air conditioning system as claimed in claim 1, further comprising a third duct which extends from said air conditioning unit to a vertically middle portion of the passenger cabin and has an opening exposed to said vertically middle portion.

8. An air conditioning system as claimed in claim 7, in which, when said unit assumes said first operation mode with said electric fan being operated, said third duct participates in discharging air from the passenger cabin to outside of the vehicle, and when said unit assumes said second operation mode with said electric fan being operated, said third duct participates in transmitting air from the vehicle cabin into said unit.

9. An air conditioning system as claimed in claim 8, further comprising a fourth duct which extends from said air conditioning unit to outside of the vehicle, said fourth duct participating in discharging air from the passenger cabin to outside of the vehicle under one of said first and third operation modes of said air conditioning unit.

10. An air conditioning system as claimed in claim 1, in which said air conditioning unit comprises:
a case in which main and bypass passages are defined, said main passage containing therein said electric fan and said evaporator, said bypass passage bypassing said main passage, said case having, at longitudinal both ends of said bypass passage, first and second openings from which said first and second ducts extend respectively, said case having further a third opening at a downstream end of said main passage;
means defining an upstream opening through which an upstream portion of said main passage and a downstream portion of said bypass passage are communicated and a downstream opening through which a downstream portion of said main passage and an upstream portion of said bypass passage are communicated;
a first door pivotally connected to said case and pivotal between a first position to close said downstream opening and a second position to close said third opening;
a second door pivotally connected to said case and having first, second and third angled positions, said first angled position being a position wherein a communication between said second opening and said upstream portion of said bypass passage is blocked, said second angled position being a position wherein said second opening is closed and said third angled position being a position wherein the communication between said second opening and said upstream portion of said bypass passage is established.

11. An air conditioning system for use with an automatic air conditioner installed in a motor vehicle, comprising:
first and second substantially identical air conditioning lines which are constructed to condition air in first and second given spaces of a passenger cabin of the vehicle respectively;
sensor means for producing information signals which are representative of respective conditions of the first and second given spaces of the passenger cabin; and
a control device for controlling said first and second air conditioning lines in accordance with the information signals issued from both said sensor means and a front air conditioner control device which controls the automatic air conditioner, said control device having a first control mode wherein said first and second air conditioning lines are independently but automatically controlled in accordance with said information signals, a second control mode wherein said first and second air conditioning lines are identically but automatically controlled in accordance with said information signals and a third control mode wherein said first and second air conditioning lines are independently controlled in a way manually set,
wherein each of said first and second air conditioning lines comprises:
a first duct extending to a ceiling of a passenger cabin of the vehicle and having an opening which is exposed to an upper portion of one given space of said passenger cabin;
a second duct extending along a floor of the vehicle and having an opening which is exposed to a lower portion of one given space of the passenger cabin;
an air conditioning unit having an electric fan means and an evaporator means installed therein, said unit being connected to said first and second ducts and having first, second and third operation modes, said first operation mode being a mode in which, under operation of said electric fan means, air in the passenger cabin is forced to be sucked into said unit through said first and second ducts and discharged to outside of the vehicle, said second operation mode being a mode in which, under operation of said electric fan, air in the passenger cabin is sucked into said unit through said second duct, cooled by said evaporator means, fed to said first duct and blown into said given space of the passenger cabin from said opening of said first duct, and said third operation mode being a mode in which contaminated air is sucked into said unit from said opening of said first duct and discharged to outside of the vehicle.

12. An air conditioning system as claimed in claim 11, in which the electric fan means of the two air conditioning lines are powered by a common electric motor, and in which the evaporator means of the two air conditioning means are spaced portions of a common evaporator.

13. An air conditioning system as claimed in claim 12, further comprising:
pipe means for fluidly connecting said common evaporator with an evaporator installed in said automatic air conditioner; and
an electromagnetic valve means connected to said pipe means for selectively opening and closing said pipe means in accordance with an instruction signal produced by said control device.

14. An air conditioning system as claimed in claim 13, in which said sensor means comprises:
first and second smoke sensors which are exposed to said first and second given spaces of the passenger cabin for respectively producing information signals representative of contamination of air in the first and second given spaces;

means for producing an information signal which represents the condition of said automatic air conditioner; and means for producing an information signal which represents the operation speed of an electric fan installed in said automatic air conditioner.

15. An air conditioning system as claimed in claim 14, in which electric voltage to be applied to said common electric motor is grouped into three, viz., higher, intermediate and lower degrees in accordance with the information signals issued from said sensor means.

16. An air conditioning system as claimed in claim 15, in which said control device comprises:

a first push button which, when pushed, permits said control device to assume said first control mode;

first means for permitting said air conditioning units of said first and second air conditioning lines to assume said first operation mode with a higher voltage applied to said common electric motor when a temperature of air blown from said automatic air conditioner is lower than a first predetermined lower temperature;

second means for permitting the air conditioning unit of said first air conditioning line to assume one of said second and third operation modes when the temperature of air from the automatic air conditioner is higher than said first predetermined lower temperature;

third means for permitting the air conditioning unit of said second air conditioning line to assume one of said second and third operation modes when the temperature of air from the automatic air conditioner is higher than said first predetermined lower temperature; and fourth means for selecting the electric voltage applied to said electric fun motor by comparing the modes which the air conditioning units of said first and second air conditioning lines assume.

17. An air conditioning system as claimed in claim 16, in which each of said second and third means comprises:

fifth means which permits the air conditioning unit of the corresponding air conditioning line to assume said third operation mode when the corresponding smoke sensor senses that the corresponding given space is contaminated with smoke;

sixth means which permits the air conditioning unit of the corresponding air conditioning line to assume said second operation mode when corresponding smoke sensor senses that the corresponding given space is not contaminated with smoke and when the temperature of air blown from said automatic air conditioner is lower than a predetermined higher temperature; and seventh means for permitting the air conditioning unit of the corresponding air conditioning line to assume said first operation mode with said common electric fan motor applied with the smaller voltage when said corresponding smoke sensor senses that the corresponding given space is not contaminated with smoke and when the temperature of air blown from said automatic air conditioner is higher than the predetermined higher temperature.

18. An air conditioning system as claimed in claim 17, in which said fifth means comprises eighth means which selects the voltage to be applied to said common electric fan motor by analyzing the information signal from the corresponding smoke sensor.

19. An air conditioning system as claimed in claim 17, in which said sixth means comprises ninth means which controls the electric voltage applied to said common electric fan motor by analyzing the amount of air blown by the automatic air conditioner.

20. An air conditioning system as claimed in claim 15, in which said control device comprises:

a second push button which, when pushed, permits said control device to assume said second control mode;

tenth means for permitting both the air conditioning units of said first and second air conditioning lines to assume said first operation mode with a higher voltage applied to said common electric fan motor when a temperature of air blown from the automatic air conditioner is lower than a first predetermined lower temperature;

eleventh means for permitting both said air conditioning units to assume said third operation mode when the temperature of air from the automatic air conditioner is higher than the first predetermined lower temperature and when at least one of the first and second smoke sensors senses that the corresponding given space is contaminated with smoke;

twelfth means for permitting both said air conditioning units to assume said second operation mode when the temperature of air from the automatic air conditioner is within a range from the first predetermined lower temperature and a second predetermined higher temperature and when said first and second smoke sensors sense that the corresponding first and second spaces are not contaminated with smoke;

thirteenth means for permitting both said air conditioning units to assume said first operation mode with said common electric fan motor applied with the smaller voltage when the temperature of air from the automatic air conditioner is higher than the second predetermined higher temperature and when said first and second smoke sensors sense that the corresponding first and second spaces are not contaminated with smoke.

21. An air conditioning system as claimed in claim 20, in which said eleventh means comprises fourteenth means which selects the voltage applied to said common electric fan motor by analyzing the information signals issued by the smoke sensor.

22. An air conditioning system as claimed in claim 21, in which said twelfth means comprises fifteenth means which controls the voltage applied to said common electric fan motor by analyzing the amount of air blown from the automatic air conditioner.

23. An air conditioning system as claimed in claim 15, in which said control device comprises:

a third push button which, when pushed, permits said control device to assume said third control mode;

a DR push button which, when pushed, permits the first air conditioning line to operate;

a AS push button which, when pushed, permits the second air conditioning line to operate;

a mode selection button which selects an operation mode which each of said first and second air conditioning lines should assume; and a fun speed control button which controls the operation speed of the common electric fan motor.

24. An air conditioning system as claimed in claim 23, further comprising:

a DP push button which, when pushed, energizes an electric air filtering device through which air directed toward the first duct of the first air conditioning line passes; and a AP push button which, when pushed, energizes an electric air filtering device through which air directed toward the first duct of the second air conditioning line passes.

* * * * *